United States Patent
Ida

(10) Patent No.: US 11,786,976 B2
(45) Date of Patent: Oct. 17, 2023

(54) CUTTING TOOL, CUTTING INSERT AND HOLDING TOOL

(71) Applicant: TUNGALOY CORPORATION, Fukushima (JP)

(72) Inventor: Takehiro Ida, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 0 days.

(21) Appl. No.: 17/454,150

(22) Filed: Nov. 9, 2021

(65) Prior Publication Data
US 2022/0266349 A1    Aug. 25, 2022

(30) Foreign Application Priority Data
Feb. 19, 2021    (JP) ................. 2021-024890

(51) Int. Cl.
*B23B 27/16*    (2006.01)
*B23B 27/00*    (2006.01)

(52) U.S. Cl.
CPC ........ *B23B 27/1651* (2013.01); *B23B 27/005* (2013.01); *B23B 27/1648* (2013.01); *B23B 2200/049* (2013.01); *B23B 2200/0495* (2013.01); *B23B 2200/165* (2013.01); *B23B 2205/12* (2013.01)

(58) Field of Classification Search
CPC ...... B23B 2200/0495; B23B 2200/165; B23B 27/1651; B23B 27/005; B23B 27/1648; B23B 27/1614; B23B 2205/12
See application file for complete search history.

(56) References Cited

U.S. PATENT DOCUMENTS 6,152,658 A * 11/2000 Satran ................. B23B 27/1614
                                                    407/120
6,379,087 B1 * 4/2002 Alexander, IV .... B23B 27/1651
                                                    407/107

(Continued)

FOREIGN PATENT DOCUMENTS

CN        101234433 A    8/2008
JP        2004-261883 A  9/2004

(Continued)

*Primary Examiner* — Sara Addisu
(74) *Attorney, Agent, or Firm* — Studebaker & Brackett PC

(57) ABSTRACT

The present invention provides a cutting tool that can firmly hold four types of cutting inserts by one tool main unit. A cutting insert of a cutting tool 1 has an approximately triangular stereoscopic shape including three corner portions. A tool main unit has a fixing portion that can selectively fix a plurality of types of cutting inserts, including: a negative type cutting insert of which angle of the corner portion exceeds 60°, a positive type cutting insert of which angle of the corner portion exceeds 60°; a negative type cutting insert of which angle of the corner portion is less than 60°; and a positive type cutting insert of which angle of the corner portion is less than 60°. The fixing portion has a bottom face that contacts with a bottom face of the cutting insert, and a side wall face that contacts with a side face of the cutting insert. A portion, which contacts with the cutting insert, of the side wall face of the fixing portion differs depending on the type of the cutting insert.

7 Claims, 27 Drawing Sheets

(56) References Cited

U.S. PATENT DOCUMENTS

| | | | | |
|---|---|---|---|---|
| 6,527,485 | B1* | 3/2003 | Little | B23B 27/1622 |
| | | | | 407/24 |
| 7,001,115 | B2* | 2/2006 | Erickson | B23B 27/1614 |
| | | | | 407/103 |
| 7,632,046 | B2* | 12/2009 | Andersson | B23B 27/1622 |
| | | | | 407/66 |
| 7,896,586 | B2* | 3/2011 | Morgulis | B23B 27/1622 |
| | | | | 407/116 |
| 8,807,884 | B2* | 8/2014 | Fang | B23C 5/2208 |
| | | | | 407/66 |
| 9,421,614 | B2* | 8/2016 | Morgulis | B23B 27/1651 |
| 2003/0206777 | A1* | 11/2003 | Gyllengahm | B23B 29/043 |
| | | | | 407/102 |
| 2005/0019112 | A1* | 1/2005 | Erickson | B23B 27/1614 |
| | | | | 407/113 |
| 2006/0257216 | A1 | 11/2006 | Kimura et al. | |
| 2008/0152440 | A1* | 6/2008 | Andersson | B23B 27/065 |
| | | | | 407/103 |
| 2008/0152441 | A1* | 6/2008 | Andersson | B23B 27/065 |
| | | | | 407/103 |
| 2010/0034602 | A1 | 2/2010 | Sung et al. | |
| 2013/0089381 | A1* | 4/2013 | Morgulis | B23B 27/04 |
| | | | | 407/103 |
| 2013/0136547 | A1* | 5/2013 | Kurokawa | B23C 5/109 |
| | | | | 407/42 |
| 2017/0100777 | A1 | 4/2017 | Lof et al. | |
| 2019/0047061 | A1 | 2/2019 | Ida et al. | |

FOREIGN PATENT DOCUMENTS

| | | |
|---|---|---|
| JP | 2007-075932 A | 3/2007 |
| JP | 2008-155366 A | 7/2008 |
| JP | 2008-155367 A | 7/2008 |
| JP | 2018-529535 A | 10/2018 |
| JP | 2019-034358 A | 3/2019 |
| WO | 2008/062825 A1 | 5/2008 |
| WO | 2013/109043 A1 | 7/2013 |

* cited by examiner

A-A

B-B

C-C

D-D

CUTTING TOOL, CUTTING INSERT AND HOLDING TOOL

BACKGROUND

Field

The present invention relates to a cutting tool, a cutting insert and a holding tool.

Description of Related Art

A cutting tool for machining normally includes a cutting insert and a tool main unit (holding tool) that holds the cutting insert. Some cutting inserts have an approximately triangular stereoscopic shape (approximately triangular prism shape) having three corner portions, and this type of cutting insert includes, for example, a type of which angle of the corner portion exceeds 60°, a type of which angle of corner portion does not exceed 60°, a negative type (not including a relief angle), a positive type (including a relief angle), and the like. These cutting inserts are fixed to a tool main unit and are used for machining (see Patent Publication JP-A-2019-34358 and Japanese Translation of PCT Application No. 2018-529535).

SUMMARY

In the case of the above mentioned plurality of types of cutting inserts having an approximately triangular prism shape, the shapes of the outer shells are different from each other and have to be firmly fixed, hence these cutting inserts are fixed to dedicated tool main units respectively. Therefore when the cutting insert is replaced with a different type of cutting insert, the tool main unit is also replaced, which drops operation efficiency. Further, cost also increases since a different tool main unit has to be provided for each type of cutting insert. Furthermore, in a case where various different shapes of work materials that change daily are processed using the cutting inserts, a number of holding tools that can be provided is limited due to the constraints of the tool rest (e.g. turret) of a machine tool, and it is preferable that various types of cutting inserts, such as four types of cutting inserts, which are negative and positive type cutting inserts of which angle of the corner portion exceeds 60°, e.g. 80°, and negative and positive type cutting inserts of which angle of the corner portion is less than 60°, e.g. 35°, can be used with one holding tool.

With the foregoing in view, it is an object of the present invention to provide a cutting tool, a cutting insert and a holding tool that can firmly hold a plurality of cutting inserts, including the above mentioned four types of cutting inserts, by one tool main unit.

A cutting tool according to an aspect of the present invention is a cutting tool including a cutting insert and a tool main unit. The cutting insert has an approximately triangular stereoscopic shape including three corner portions. The tool main unit has a fixing portion that can selectively fix a plurality of types of cutting inserts, including a negative type cutting insert of which angle of the corner portion exceeds 60°, a positive type cutting insert of which angle of the corner portion exceeds 60°, a negative type cutting insert of which angle of the corner portion is less than 60°, and a positive type cutting insert of which angle of the corner portion is less than 60°. The fixing portion has a bottom face that contacts with a bottom face of the cutting insert, and a side wall face that contacts with a side face of the cutting insert, and a portion, which contacts with the cutting insert, of the side wall face of the fixing portion differs depending on the type of the cutting insert.

According to this aspect, the four types of cutting inserts can be firmly held by one tool main unit.

In the above aspect, the side wall face of the fixing portion may have, at a center, a center wall face, and receded wall faces which are connected to both ends of the center wall face and are receded further backward of the tool main unit than the center wall face, and have portions that contact with the cutting insert in the center wall face and the receded wall faces.

In the above aspect, the side wall face of the fixing portion may have portions that contact with the cutting insert in an upper part of the center wall face and upper parts of the receded wall faces.

In the above aspect, the cutting inserts may have three peripheral side faces each of which is located between adjacent corner portions, each of the peripheral side faces of the cutting insert may include: a corner face that constitutes a corner portion; a center face that is formed at a center between two adjacent corner portions; and a connecting face that is disposed between the center face and the corner face and connects the center face and the corner face. Either a first portion of the center face of the cutting insert or a second portion, constituted of the connecting face and the corner face, may contact with the side wall face of the fixing portion.

In the above aspect, three types of cutting inserts, which are a positive type cutting insert of which angle of the corner portion exceeds 60°, a negative type cutting insert of which angle of the corner portion is less than 60°, and a positive type cutting insert of which angle of the corner portion is less than 60°, may contact a common first portion of the side wall face of the fixing portion, and a negative type cutting insert of which angle of the corner portion exceeds 60°, may contact a second portion, which is different from the common first portion contacted by the three types of cutting inserts, of the side wall face of the fixing portion.

In the above aspect, the second portion of the side wall face of the fixing portion may be located further outward of the center of the side wall face than the first portion.

A cutting insert according to another aspect of the present invention is a cutting insert having an approximately triangular stereoscopic shape including three corner portions of which angles exceed 60° or less than 60°, and having three peripheral side faces each of which is located between adjacent corner portions. Each of the peripheral side faces include: a corner face that constitutes a corner portion; a center face that is formed at a center between adjacent corner portions; and a connecting face that is disposed between the center face and the corner face and connects the center face and the corner face. A contact portion that contacts with a tool main unit, when the cutting insert is fixed to the tool main unit of the cutting tool, is formed either in a first portion of the center face or a second portion constituted of the connecting face and the corner face.

In the above aspect, the cutting insert may be a positive type cutting insert of which angle of the corner portion exceeds 60°, a negative type cutting insert of which angle of the corner portion is less than 60°, or a positive type cutting insert of which angle of the corner portion is less than 60°, and a contact portion, which contacts with the tool main unit when the cutting insert is fixed to the tool main unit of the cutting tool, may be formed in the first portion of the center face.

In the above aspect, the cutting insert may be a negative type cutting insert of which angle of the corner portion exceeds 60°, and a contact portion, which contacts with the tool main unit when the cutting insert is fixed to the tool main unit of the cutting tool, may be formed in a second portion constituted of the connecting face and the corner face.

A holding tool according to another aspect of the present invention is a holding tool holding a cutting insert that has an approximately triangular stereoscopic shape including three corner portions, the holding tool including: a fixing portion that can selectively fix a plurality of types of cutting inserts including a negative type cutting insert of which angle of the corner portion exceeds 60°, a positive type cutting insert of which angle of the corner portion exceeds 60°, a negative type cutting insert of which angle of the corner portion is less than 60°, and a positive type cutting insert of which angle of the corner portion is less than 60°. The fixing portion has a bottom face that contacts with a bottom face of the cutting insert, and a side wall face that contacts with a side face of the cutting insert, and a portion, which contacts with the cutting insert, of the side wall face of the fixing portion differs depending on the type of the cutting insert.

In the above aspect, the side wall face of the fixing portion may have, at a center, a center wall face, and receded wall faces which are connected to both ends of the center wall face and are receded further backward of a tool main unit than the center wall face, and have portions that contact with the cutting insert in the center wall face and the receded wall faces.

In the above aspect, the side wall face of the fixing portion may have portions that contact with the cutting insert in the upper parts of the center wall face and the upper part of the receded wall faces.

In the above aspect, three types of cutting inserts, which are a positive type cutting insert of which angle of the corner portion exceeds 60°, a negative type cutting insert of which angle of the corner portion is less than 60°, and a positive type cutting insert of which angle of the corner portion is less than 60°, may contact a common first portion of the side wall face of the fixing portion, and a negative type cutting insert of which angle of corner portion exceeds 60°, may contact a second portion, which is different from the common first portion contacted by the three types of cutting inserts, of the side wall face of the fixing portion.

In the above aspect, the second portion of the side wall face of the fixing portion may be located further outward of the center of the side wall face than the first portion.

DETAILED DESCRIPTION

Preferred embodiments of the present invention will be described with reference to the drawings.

Figure 1:
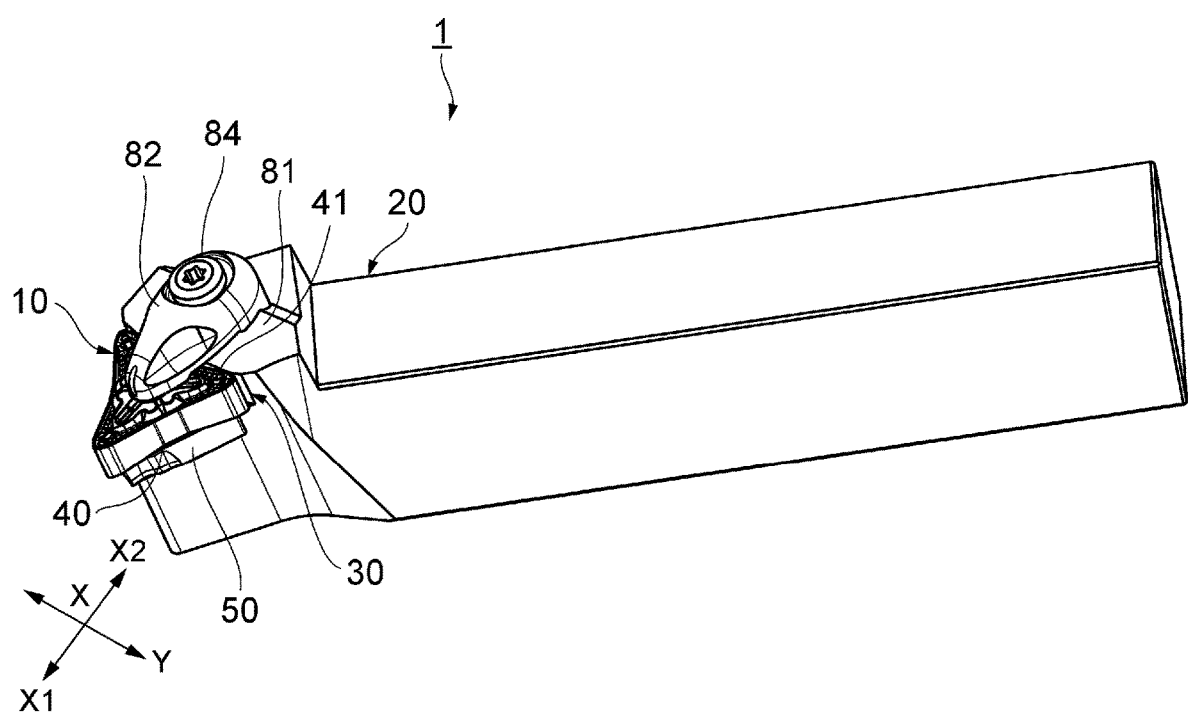
FIG. 1 is a perspective view of a cutting tool.

FIG. 1 is a diagram depicting an example of a cutting tool 1 according to the present embodiment. The cutting tool 1 is a cutting edge replaceable type tool for machining. The cutting tool 1 includes a cutting insert 10 and a tool main unit (holding tool) 20 to which the cutting insert 10 is fixed.

Tool Main Unit

Figure 2:
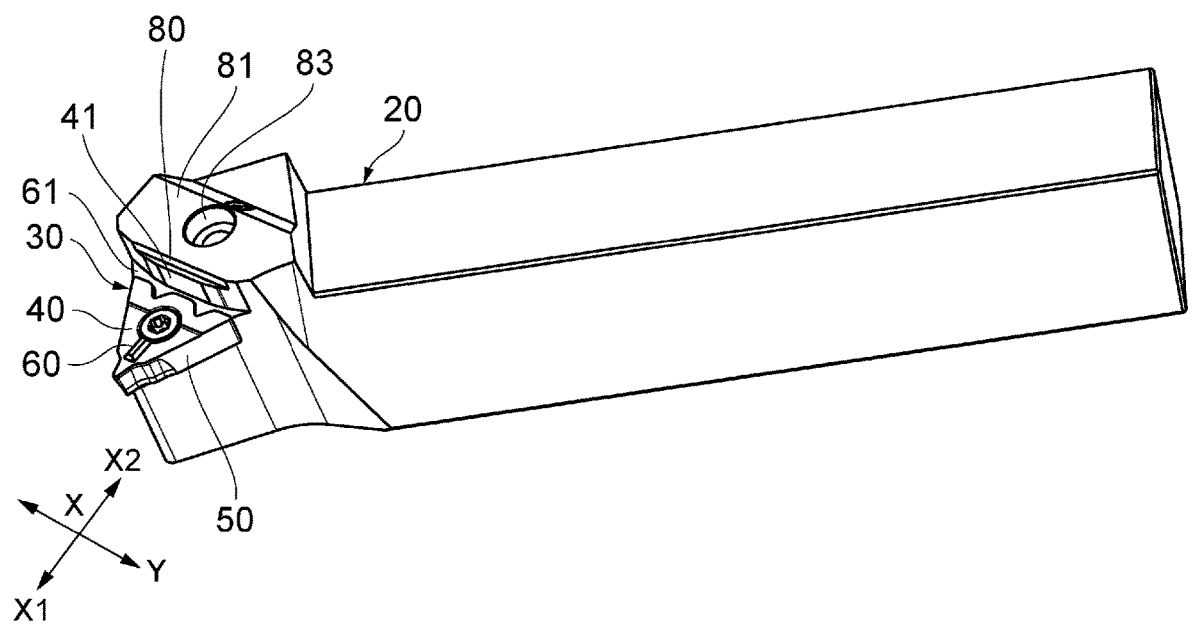
FIG. 2 is a perspective view of a tool main unit.
Figure 3:
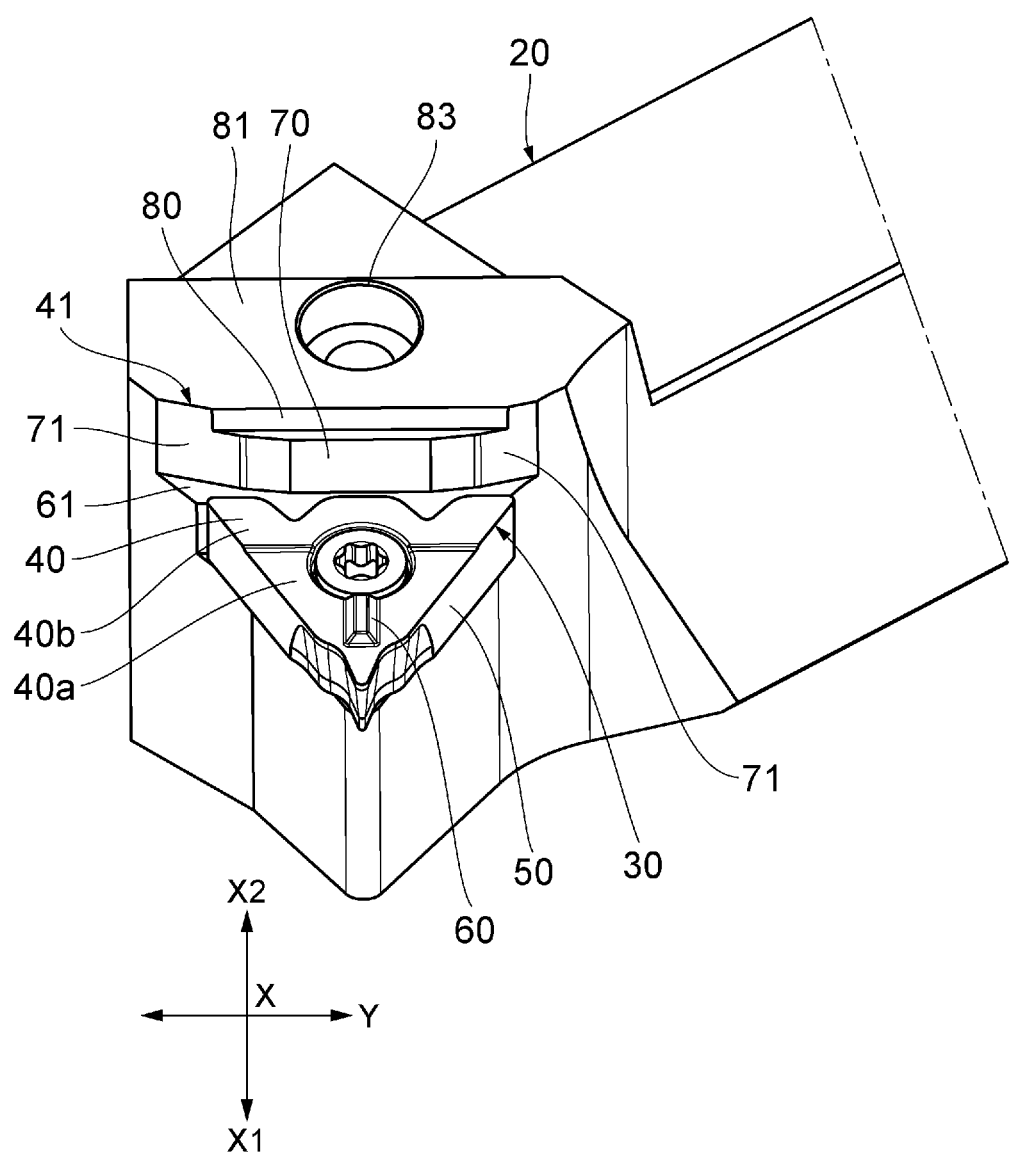
FIG. 3 is a front view of a fixing portion of the tool main unit.

The tool main unit 20 is configured to selectively hold a plurality of types of cutting inserts 10 having three corner portions. The tool main unit 20 is formed in an approximately prism shape, and has a fixing portion 30 of the cutting insert 10. As illustrated in FIG. 2 and FIG. 3, the fixing portion 30 includes a bottom face 40 which contacts with the bottom face of the cutting insert 10, and a side wall face 41 which contacts with the side face of the cutting insert 10.

The bottom face 40 is formed using a top face of a shim 50 of the tool main unit 20, for example. However the bottom face 40 may be formed using the tool main unit 20 itself instead of the shim 50.

The bottom face 40 has an approximately equilateral triangular shape. The bottom face 40 is formed such that one of the apexes of the triangle faces the front end side of the tool main unit 20 (in the front end direction X1 in FIG. 2 and FIG. 3). A protruded portion 60, which protrudes upward and extends in the front end direction X1, is formed on the front end side of the bottom face 40. The bottom face 40 has a first bottom face 40a on the front end side, and a second bottom face 40b on the rear end side. The first bottom face 40a and the second bottom face 40b are generally both flat, and the first bottom face 40a is lower than the second bottom face 40b, therefore a step is formed between the first bottom face 40a and the second bottom face 40b. The protruded portion 60 is formed on the first bottom face 40a. There is a flat surface 61 on the rear portion of the bottom face 40 (area between the bottom face 40 and the side wall face 41), and this flat surface 61 is lower than the second bottom face 40b. The term "up" here refers to the upward direction when the tool main unit 20 is set as illustrated in FIG. 2 and FIG. 3.

The side wall face 41 is vertically formed at the edge of the bottom face 40 on the rear end side (rear end direction X2 in FIG. 2 and FIG. 3). The side wall face 41 is an approximately rectangular shape which extends in the left/right direction Y (direction perpendicular to the front/back direction X in FIG. 2 and FIG. 3). The side wall face 41 has a center wall face 70 in the center in the left/right direction Y and receding wall surfaces 71 that are connected to both ends of the center wall face 70, and recedes backward from the center wall face 70.

The center wall face 70 is a rectangular flat surface. The center wall face 70 is slightly inclined (inclined forward) from the vertical plane of the bottom face 40, such that the upper side of the center wall face 70 locates forward in the front end direction X1, and the lower side thereof locates backward in the rear end direction X2 with respect to the vertical plane of the bottom face 40.

The receded wall faces 71 are curved surfaces that gradually recede from the center wall face 70 in the left/right direction Y. Just like the center wall face 70, the receded wall faces 71 are slightly inclined (inclined forward) from the vertical plane of the bottom face 40, such that the upper side locates forward in the front end direction X1, and the lower side locates backward in the rear end direction X2 with respect to the vertical plane of the bottom face 40.

The tool main unit 20 has a step 80 on the upper part of the side wall face 41, for example, and the step 80 is connected to a flat surface 81 located on the side in the rear end direction X2. A hole 83 to fix a clamp 82 (illustrated in FIG. 1), which holds the cutting insert 10 from above, is formed around the center of the flat surface 81. As illustrated in FIG. 1, the clamp 82 is fixed to the flat surface 81 of the tool main unit 20 by a screw 84, and press-holds the end face of the cutting insert 10 and the inner face of the hole for fixing.

The tool main unit 20 selectively holds a plurality of types of cutting inserts 10, including at least four types, which are: a negative type cutting insert of which angle of the corner portion exceeds 60°, a positive type cutting insert of which angle of the corner portion exceeds 60°, a negative type cutting insert of which angle of the corner portion is less than 60°, and a positive type cutting insert of which angle of the corner portion is less than 60°.

Figure 4:
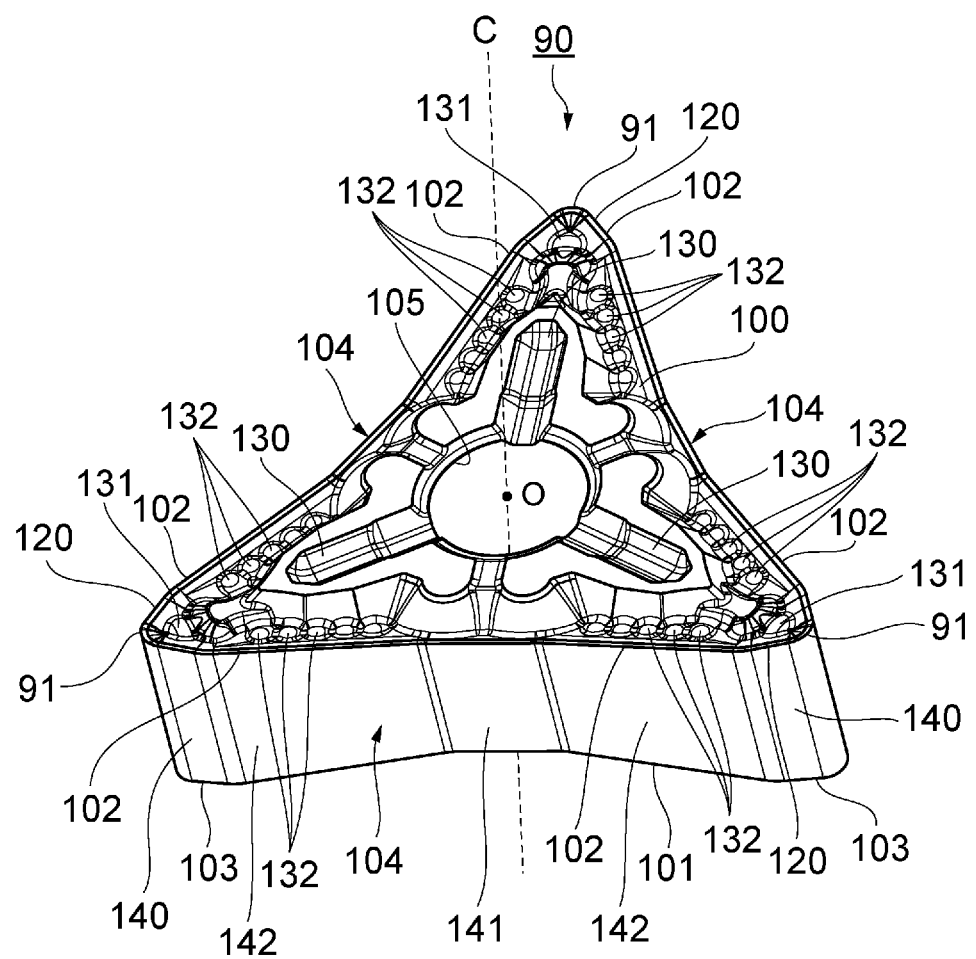
FIG. 4 is a perspective view of a first cutting insert.
Figure 5:
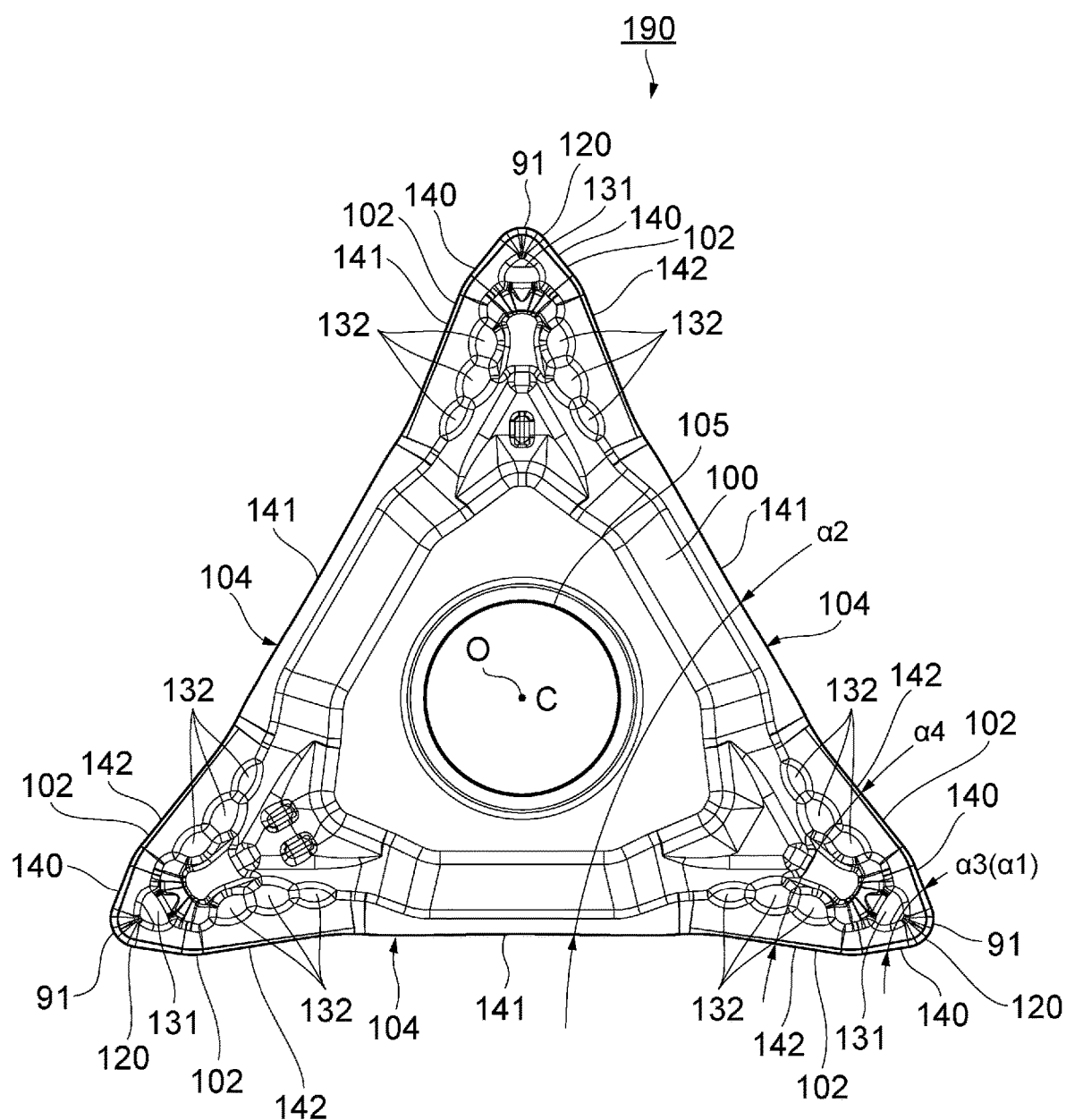
FIG. 5 is a plan view of the first cutting insert.
Figure 6:
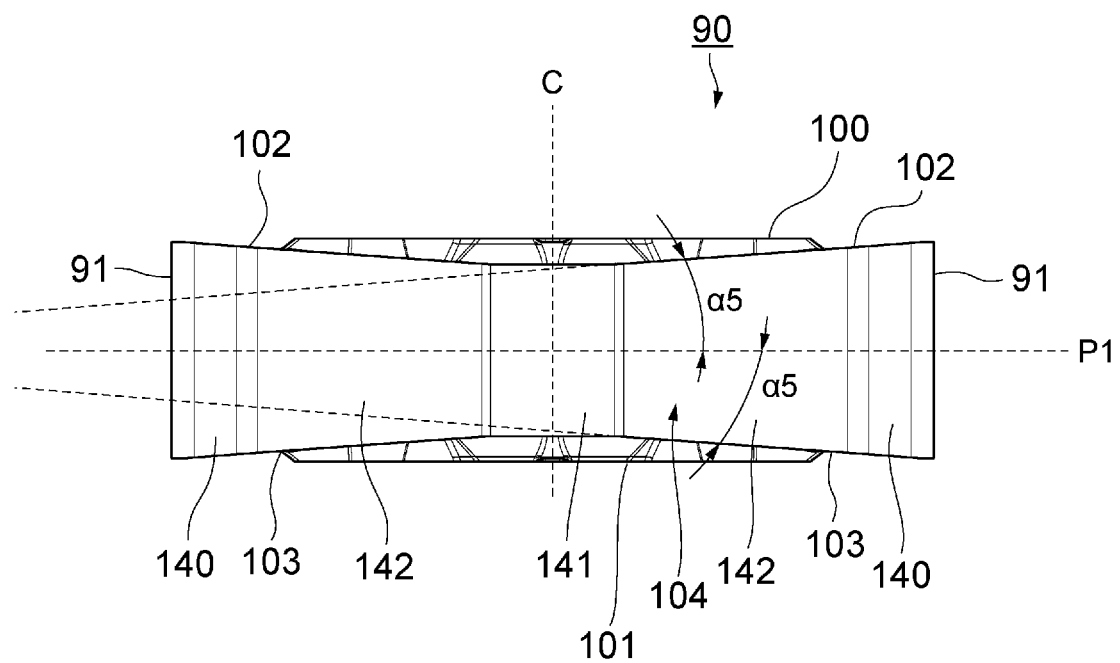
FIG. 6 is a side view of the first cutting insert.

FIG. 4 to FIG. 6 illustrate an example of a first cutting insert 90 which is a negative type cutting insert of which angle of the corner portion exceeds 60°. FIG. 4 is a perspective view depicting an example of the first cutting insert 90, FIG. 5 is a plan view of the first cutting insert 90 viewed from the first end face, and FIG. 6 is a side view of the first cutting insert 90.

First Cutting Insert

As illustrated in FIG. 4, the first cutting insert 90 has an approximately flat triangular stereoscopic shape (approximately triangular prism shape), for example. Each of the three corner portions 91 of the first cutting insert 90 has an 80° point angle α1 (indicated in FIG. 5).

As illustrated in FIG. 4 to FIG. 6, the first cutting insert 90 includes: a first end face 100 and a second end face which are approximately triangular-shaped and which face each other; three peripheral side faces 104 which connect the first end face 100 and the second end face 101, and which form crossing ridge lines 102 and 103 with the first end face 100 and with the second end face 101 respectively; and a fixing hole 105 which penetrates from the first end face 100 to the second end face 101. The crossing ridge lines 102 and 103 in the vicinity of each corner portion 91 constitute a cutting edge 120.

As illustrated in FIG. 4 and FIG. 5, the first end face 100 has the fixing hole 105 at the center thereof. The center O of the first end face 100 is located on the center axis C of the fixing hole 105. The first end face 100 includes three grooves 130, which is formed from the center O toward each apex (corner portion 91). The first end face 100 has a first chip breaker 131 and a second chip breaker 132 in the vicinity of a cutting edge 120 of each corner portion 91 respectively. The first chip breaker 131 is disposed in the vicinity of the apex of each corner portion 91 and includes one projection which projects upward, for example. The second chip breaker 132 includes a plurality of projections which project upward, for example, and is disposed along the crossing ridge line 102 extending from the vicinity of the apex of each corner portion 91 toward the apex of the next corner portion 91. The plurality of projections of the second chip breaker 132 are linearly disposed next to each other along the crossing ridge line 102. By this second chip breaker 132, the chip discharge performance can be improved in the back turning operation of the cutting insert 90. For example, the second end face 101 has the same configuration as the first end face 100. The first cutting insert 90 can be used regardless whether the first end face 100 is the top face, or the second end face 101 is the top face.

As illustrated in FIG. 4 and FIG. 6, each peripheral side face 104 includes the corner face 140 which forms the corner portion 91, a center face 141 which is formed at the center between adjacent corner portions 91, and a connecting face 142 which is formed between the center face 141 and the corner face 140, and which connects the center face 141 and the corner face 140. The first cutting insert 90, which is a negative type, does not have a relief angle, and each peripheral side face 104 is a surface that is vertical to the first end face 100 and the second end face 101.

As illustrated in FIG. 5, in the plan view viewed from the first end face 100 side, an angle α2, formed by the two center faces 141 on each side of the corner portion 91, is 60°. An angle α3, formed by the two corner faces 140 on each side of the corner portion 91, is 80°. An angle α4, formed by the two connecting faces 142 on each side of the corner portion 91, is 45°. Thereby a convex portion 150, which expands outward in the view from the first end face 100 (center axis C) side, is formed on the connecting portion between the connecting face 142 and the corner portion 91. This convex portion 150 becomes a contact portion that contacts with the side wall face 41 of the tool main unit 20.

As illustrated in FIG. 6, the crossing ridge lines 102 and 103 are inclined so as to be most distant from a virtual mid-plane P1 at the apex of the corner portion 91, and to be closest to the virtual mid-plane P1 at the center between the adjacent corner portions 91. The virtual mid-plane P1 is a virtual plane which is vertical to the center axis C, and which passes through the center between the first end face 100 and the second end face 101. In the case of the negative type cutting insert of this example, it is preferable that the inclination angle α5 of the crossing ridge line 102 or 103, with respect to the virtual mid-plane P1, is at least 1° and not more than 7°, for example. By this inclination of the crossing ridge lines 102 and 103, the chip discharge performance can be improved. In this example, the crossing ridge lines 102 and 103 are linear in the side view in FIG. 6, but may be curved. In this case, the inclination angle α5 is an angle formed by: a line connecting a point of the crossing ridge line 102 or 103 that is most distant from the virtual mid-plane P1; and a point of the crossing ridge line 102 or 103 that is closest to the virtual mid-plane P1, and the virtual mid-plane P1.

As illustrated in FIG. 5, the fixing hole 105 penetrates at the center of the first cutting insert 90 in a direction from the first end face 100 to the second end face 101 (thickness direction).

Second Cutting Insert

Figure 7:
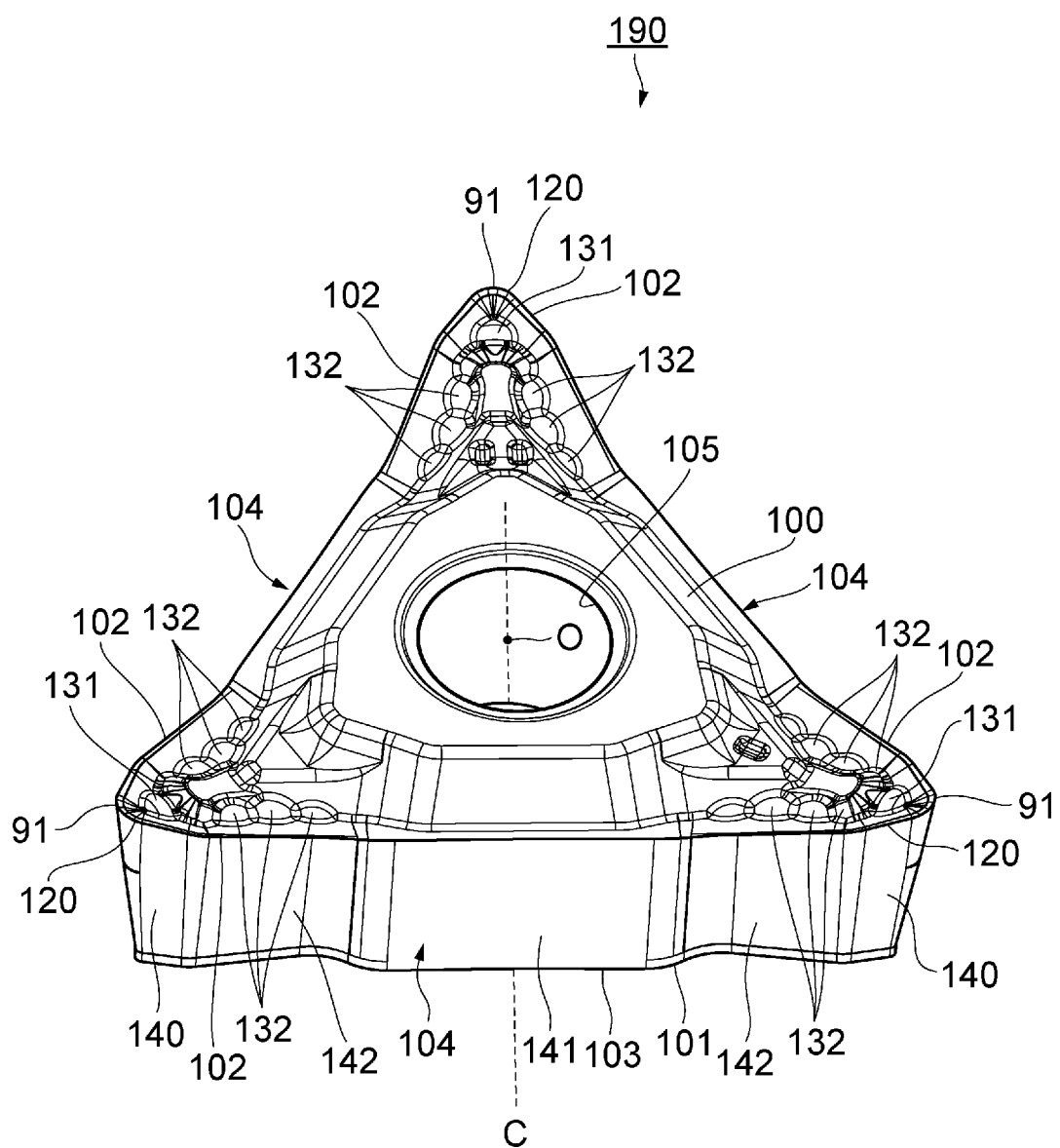
FIG. 7 is a perspective view of a second cutting insert.
Figure 8:
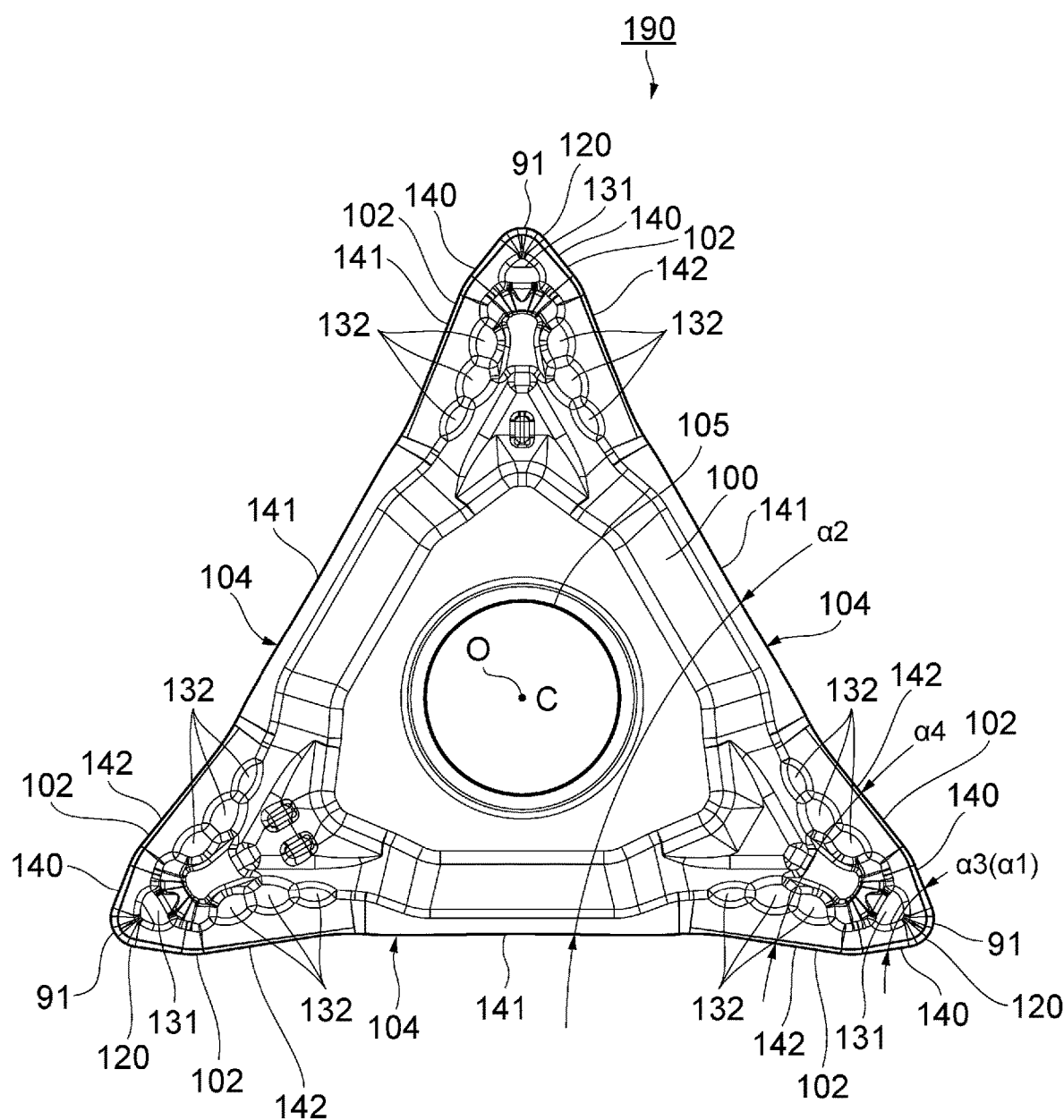
FIG. 8 is a plan view of the second cutting insert.
Figure 9:
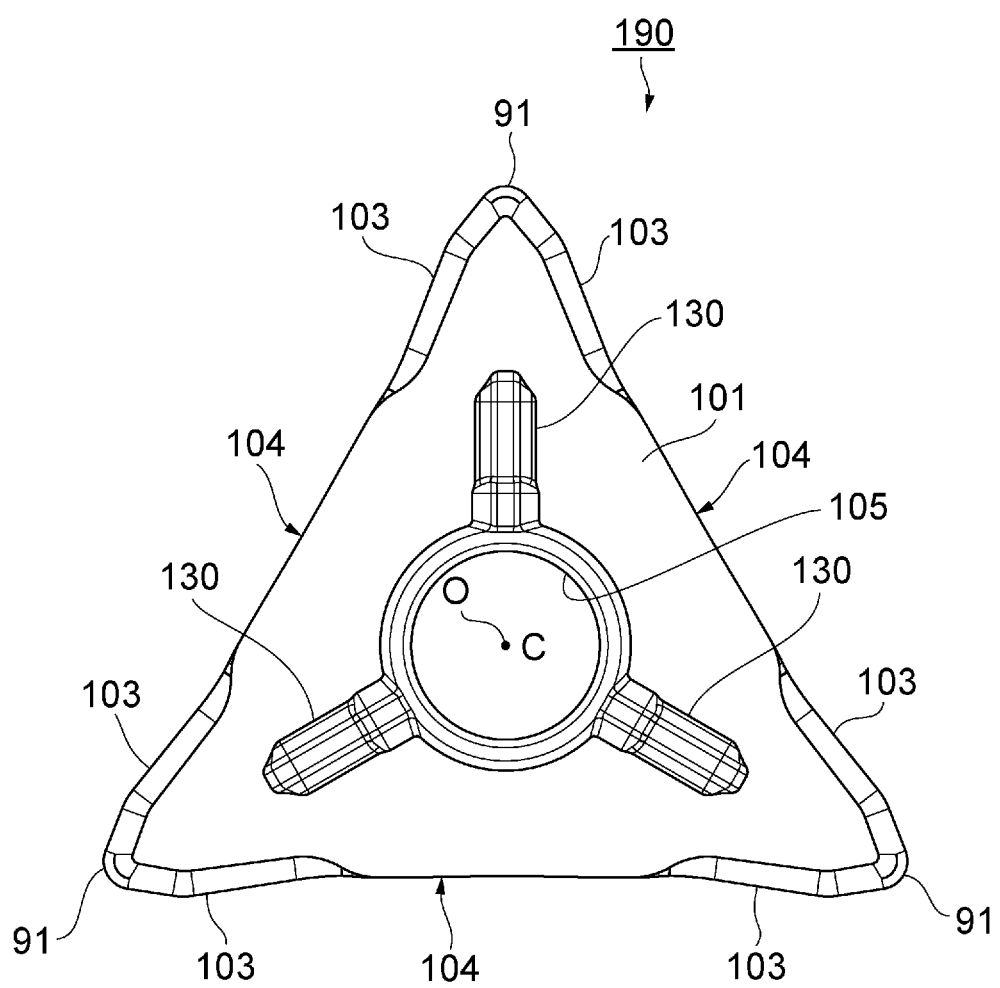
FIG. 9 is a bottom view of the second cutting insert.
Figure 10:
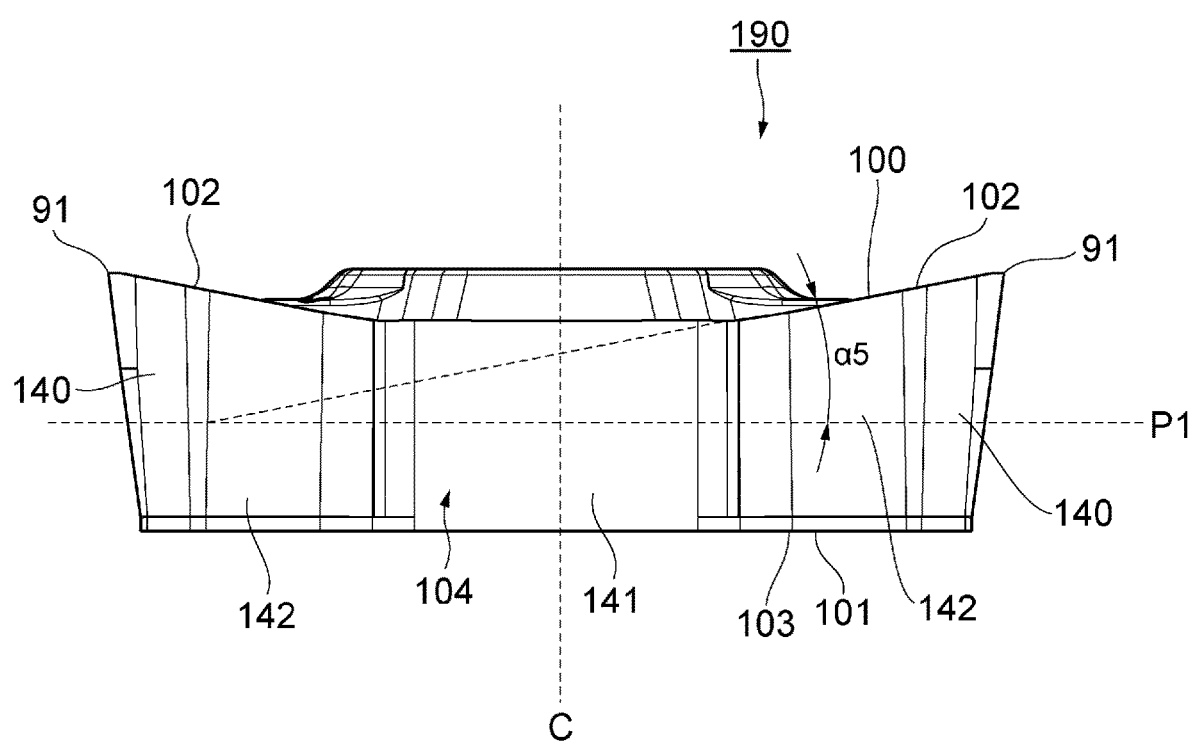
FIG. 10 is a side view of the second cutting insert.

FIG. 7 to FIG. 10 illustrate an example of a positive type cutting insert 190 of which angle of the corner portion exceeds 60°. FIG. 7 is a perspective view depicting an example of the second cutting insert 190, FIG. 8 is a plan view of the second cutting insert 190 viewed from the first end face 100, and FIG. 9 is a bottom view of the second cutting insert 190 viewed from the second end face 101. FIG. 10 is a side view of the second cutting insert 190.

As illustrated in FIG. 7 to FIG. 10, the second cutting insert 190, which is a positive type, has a configuration that is different from the first cutting insert 90, which is a negative type. In other words, the second cutting insert 190, which is a positive type, has a relief angle, and the portions of each peripheral side face 104 except in the vicinity of the center face 141 (e.g. corner face 140 and connecting face 142) are surfaces inclined with respect to the vertical plane of the first end face 100.

As illustrated in FIG. 7 and FIG. 8, the first end face 100 includes the chip breakers 131 and 132, but does not include the grooves 130, for example. As illustrated in FIG. 9, the second end face 101 has a different configuration from the first end face 100. The second end face 101 includes the grooves 130, but does not include the chip breakers 131 and 132, and has a flat bottom face except for the portions of the grooves 130.

As illustrated in FIG. 10, the corner face 140 and the connecting face 142 of each peripheral side face 104 are inclined, having a 90° or less angle with respect to the first end face 100. Then as illustrated in FIG. 8, an angle $\alpha 2$, formed by the upper edges (enter crossing ridge lines) of the two center faces 141 on each side of the corner portion 91, is 60° in the view from the first end face 100 side in the center axis C direction. An angle $\alpha 3$, formed by the upper edges (corner crossing ridge lines) of the two corner faces 140 on each side of the corner portion 91, is 80°. An angle $\alpha 4$, formed by the upper edges (connecting crossing ridge lines) of the two connecting faces 142 on each side of the corner portion 91, is 45°. The vicinity of the upper edge of the center face 141 becomes a contact portion that contacts with the side wall face 41 of the tool main unit 20. In the case of the positive type cutting insert of this example, it is preferable that the inclination angle $\alpha 5$ of the crossing ridge line 102 or 103, with respect to the virtual mid-plane P1 (see FIG. 10), is at least 1° and not more than 22°, for example.

A portion of the second cutting insert 190, not mentioned here, has the same configuration as the first cutting insert 90, therefore this portion is denoted with the same reference sign as the first cutting insert 90, and description thereof is omitted.

Third Cutting Insert

Figure 11:
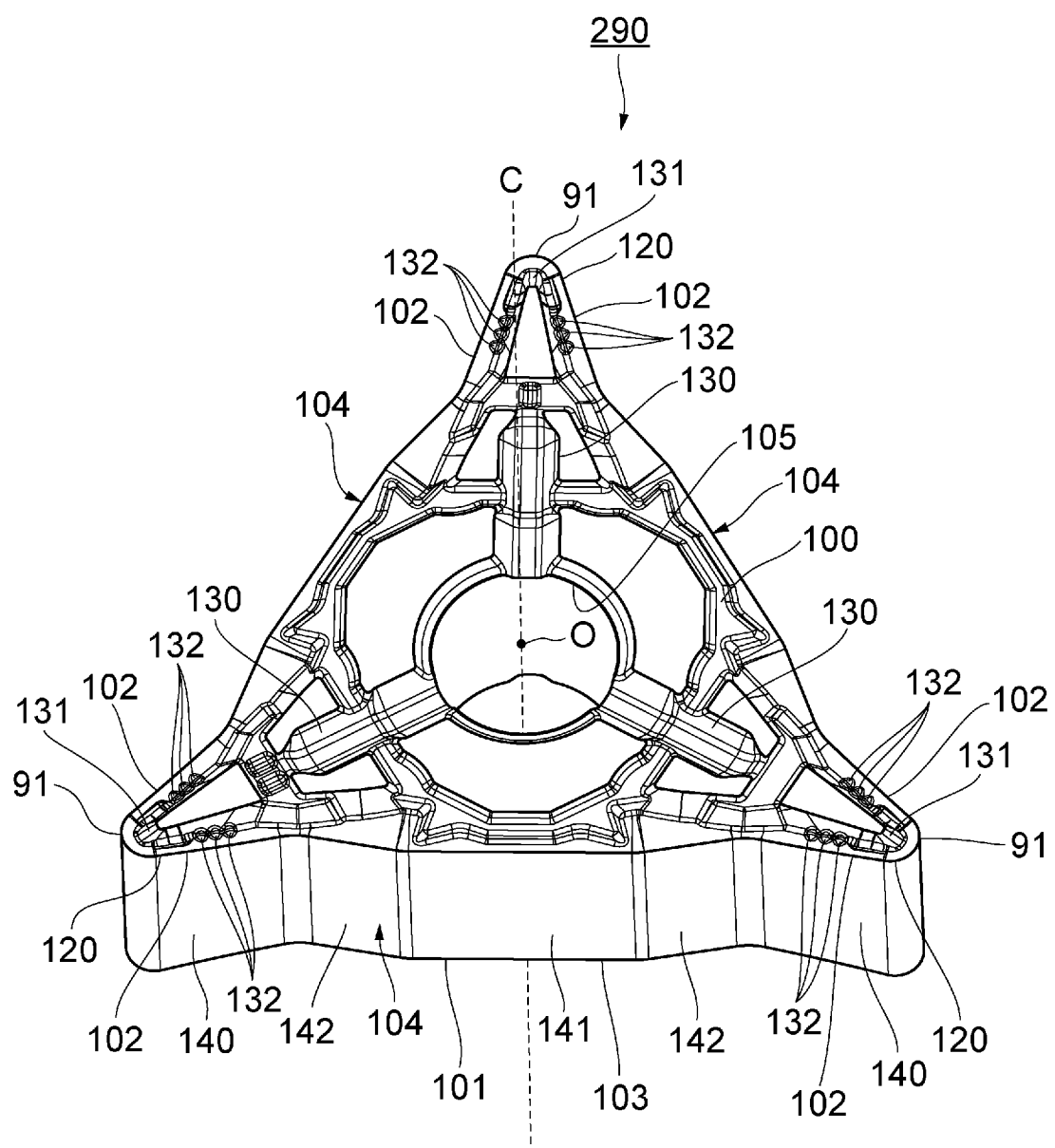
FIG. 11 is a perspective view of a third cutting insert.
Figure 12:
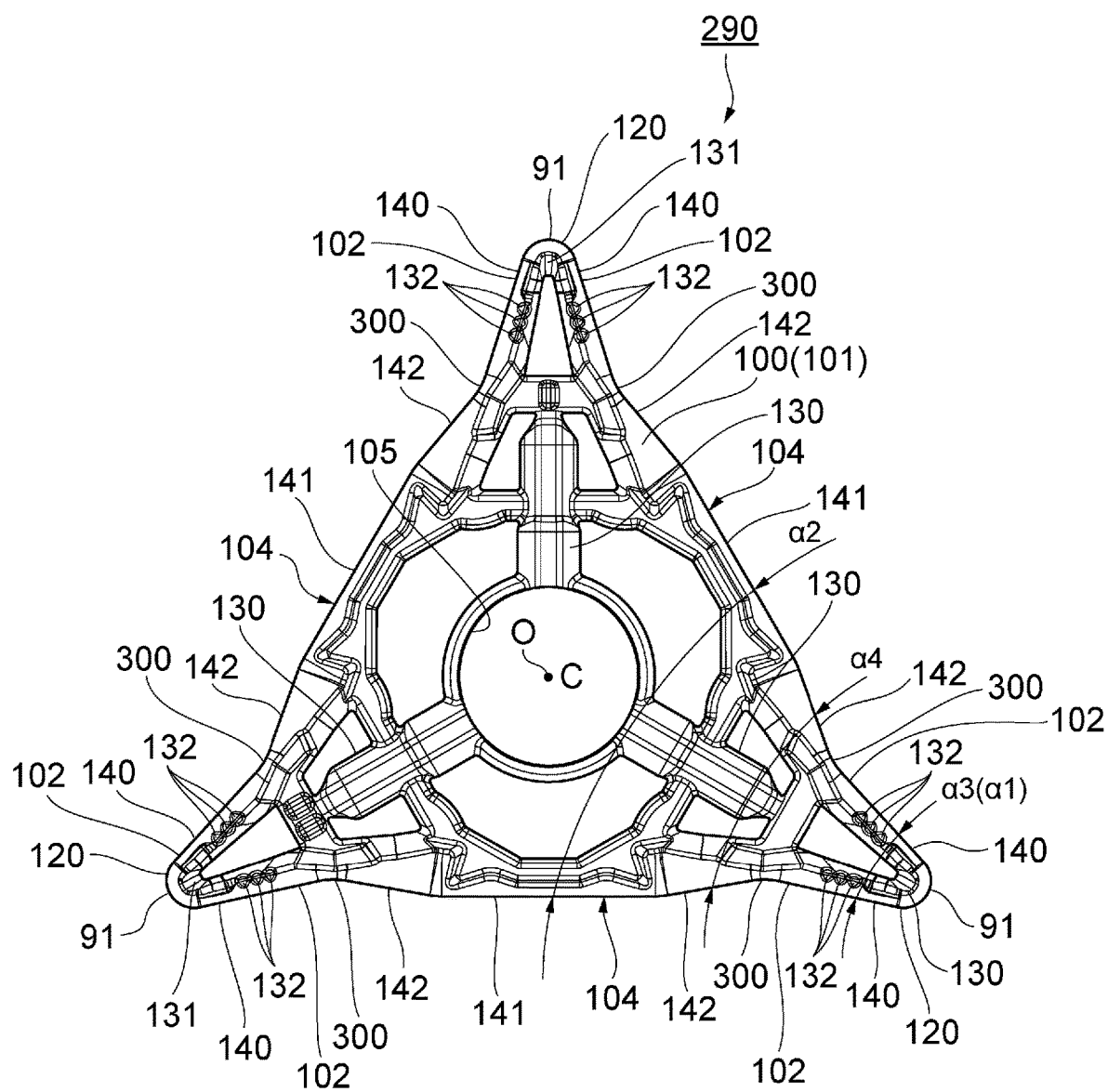
FIG. 12 is a plan view of the third cutting insert.
Figure 13:
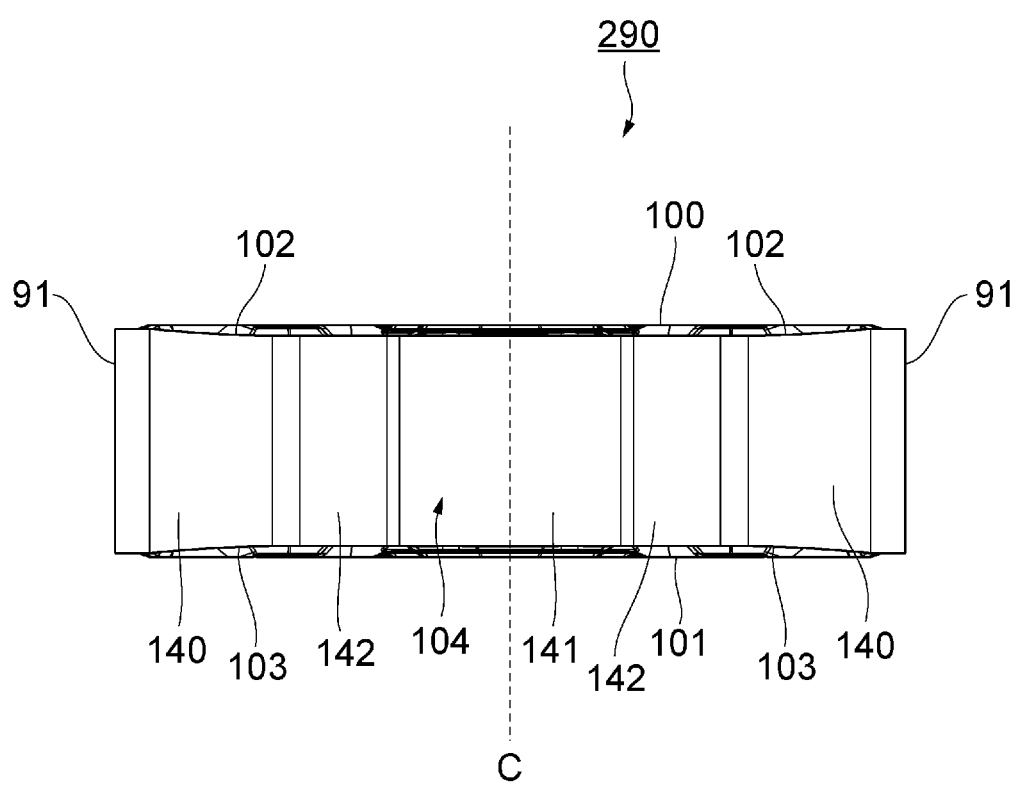
FIG. 13 is a side view of the third cutting insert.

FIG. 11 to FIG. 13 illustrate a negative type cutting insert 290 of which angle of the corner portion is less than 60°. FIG. 11 is a perspective view depicting an example of the third cutting insert 290, FIG. 12 is a plan view of the third cutting insert 290 viewed from the first end face 100, and FIG. 13 is a side view of the third cutting insert 290.

As illustrated in FIG. 11 to FIG. 13, the third cutting insert 290 has a different configuration as the first cutting insert 90, since the angle of the corner portion is less than 60°. In other words, as illustrated in FIG. 12, each of the three corner portions 91 of the third cutting insert 290 has a 35° point angle $\alpha 1$. In a view viewed from the first end face 100 side in the center axis C direction, an angle $\alpha 2$, formed by the two center faces 141 on each side of the corner portion 91, is 60°. An angle $\alpha 3$, formed by the two corner faces 140 on each side of the corner portion 91, is 35°. An angle $\alpha 4$, formed by the two connecting faces 142 on each side of the corner portions 91, is 80°. Thereby, on the connecting portion between the connecting face 142 and the corner face 140, a concave portion 300, which concaves inward, is formed in the plan view viewed from the first end face 100 side. Here, the center face 141 becomes a contact portion that contacts with the side wall face 41 of the tool main unit 20. A portion of the third cutting insert 290, not mentioned here, has the same configuration as the first cutting insert 90, therefore this portion is denoted with the same reference sign as the first cutting insert 90, and description thereof is omitted.

Fourth Cutting Insert

Figure 14:
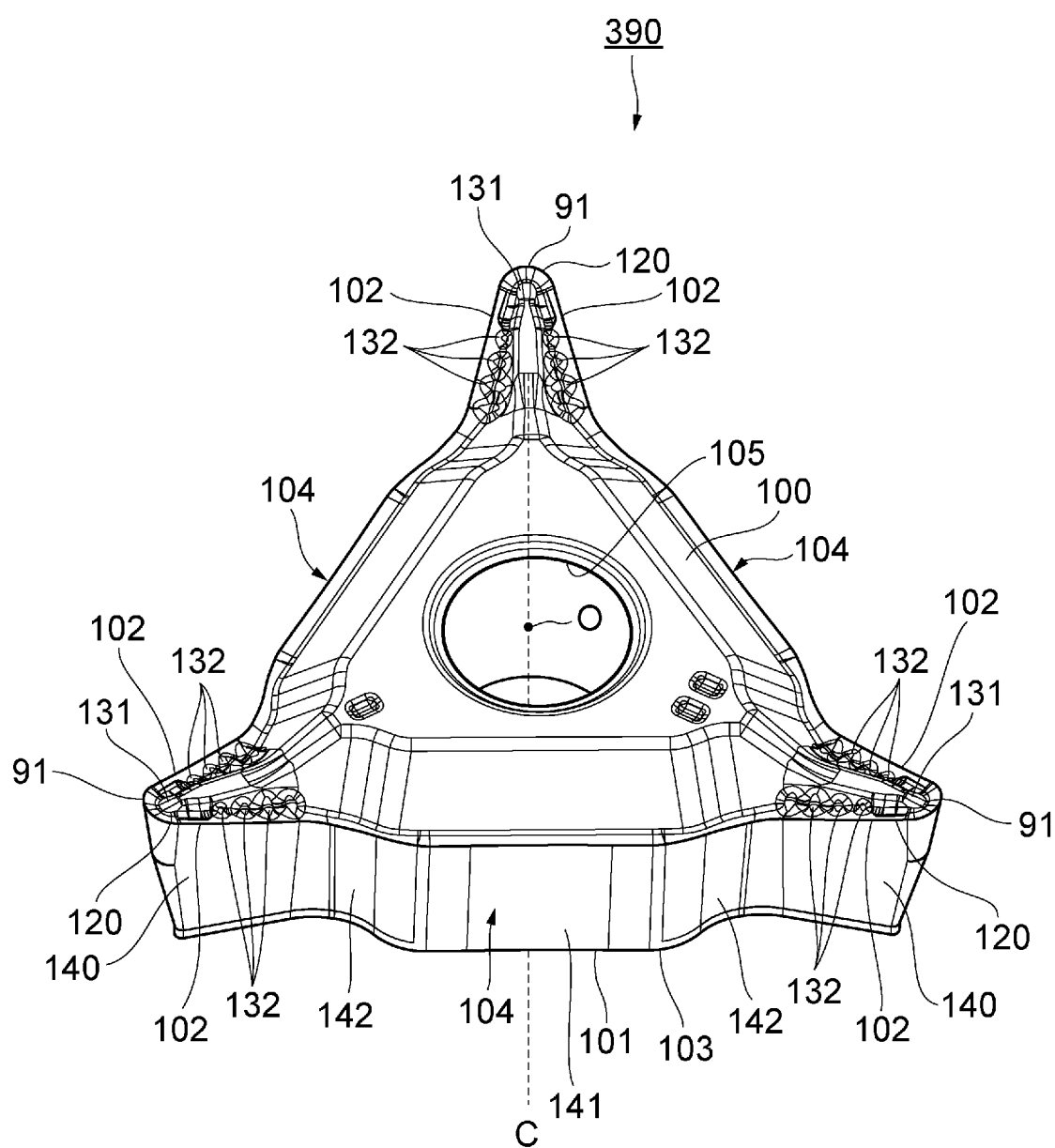
FIG. 14 is a perspective view of a fourth cutting insert.
Figure 15:
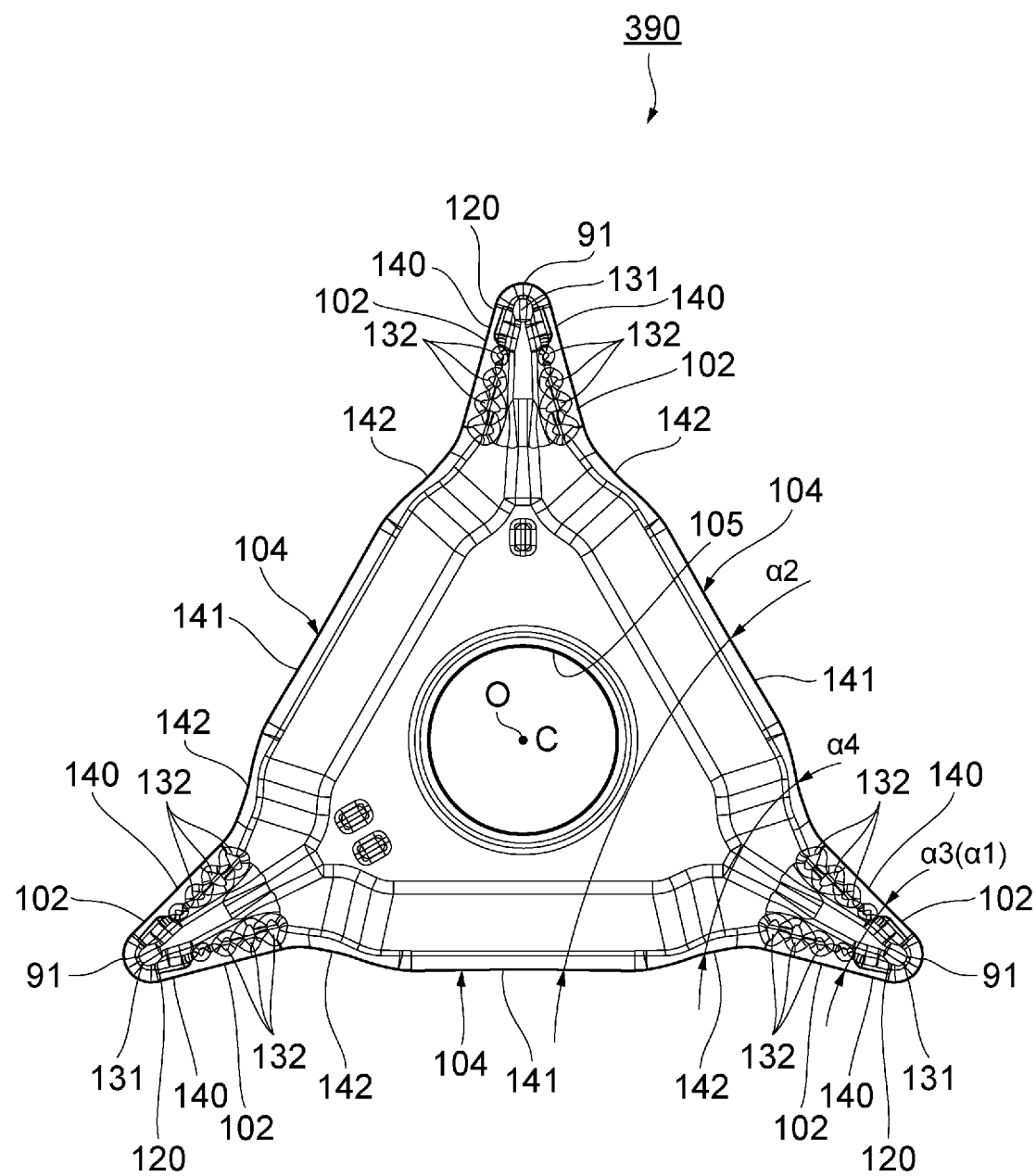
FIG. 15 is a plan view of the fourth cutting insert.
Figure 16:
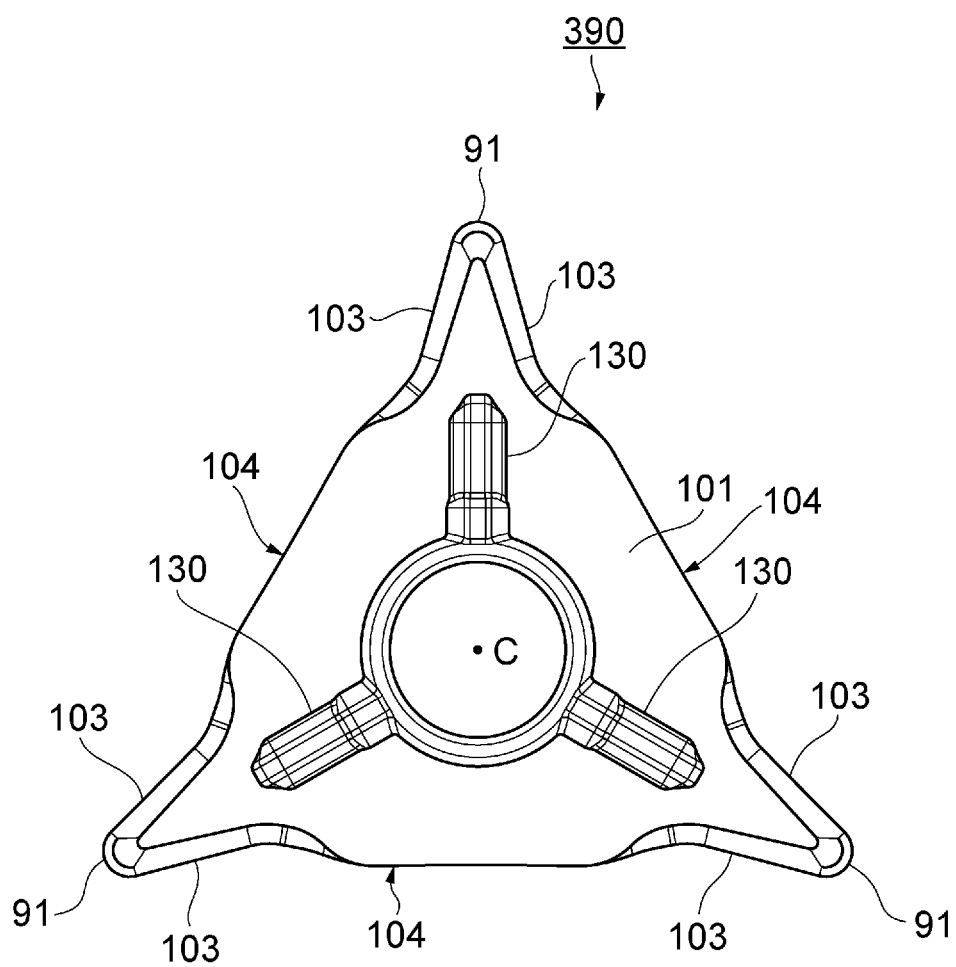
FIG. 16 is a bottom view of the fourth cutting insert.
Figure 17:
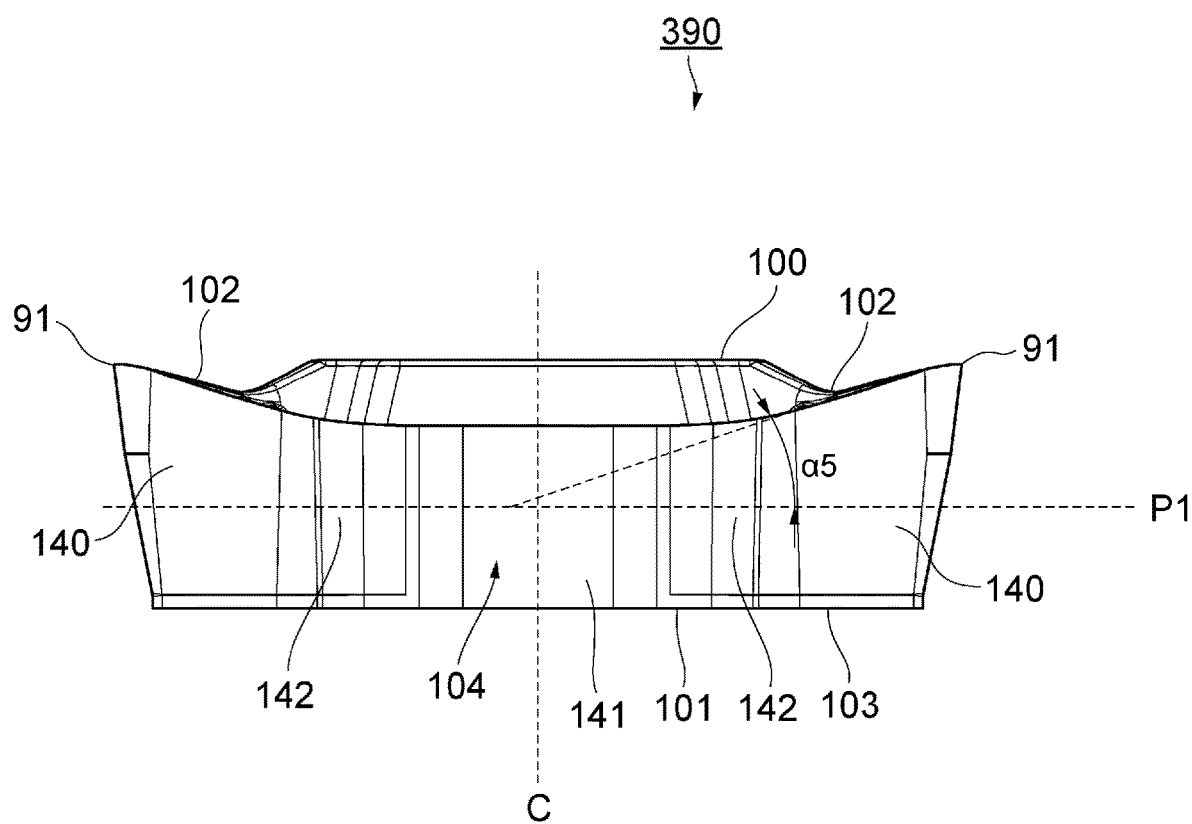
FIG. 17 is a side view of the fourth cutting insert.

FIG. 14 to FIG. 17 illustrate a positive type fourth cutting insert 390 of which angle of the corner portion is less than 60°. FIG. 14 is a perspective view depicting an example of the fourth cutting insert 390, FIG. 15 is a plan view of the fourth cutting insert 390 viewed from the first end face 100, and FIG. 16 is a bottom view of the fourth cutting insert 390 viewed from the second end face 101. FIG. 17 is a side view of the fourth cutting insert 390.

As illustrated in FIG. 14 to FIG. 17, the fourth cutting insert 390, which is a positive type, has a configuration that is different from the third cutting insert 290, which is a negative type. In other words, the fourth cutting insert 390, which is a positive type, has a relief angle, and the portions of each peripheral side face 104 except for the vicinity of the center face 141 (e.g. corner face 140 and the connecting face 142) are surfaces inclined with respect to the vertical plane of the first end face 100.

As illustrated in FIG. 14 and FIG. 15, the first end face 100 includes the chip breakers 131 and 132, but does not include the grooves 130, for example. As illustrated in FIG. 16, the second end face 101 has a different configuration from the first end face 100. The second end face 101 includes the grooves 130, but does not include the chip breakers 131 and 132, and has a flat bottom face except for the portions of the grooves 130.

As illustrated in FIG. 17, the corner face 140 and the connecting face 142 of each peripheral side face 104 are inclined, having a 90° or less angle with respect to the first end face 100. Then as illustrated in FIG. 15, an angle $\alpha 2$, formed by the upper edges (center crossing ridge lines) of the two center faces 141 on each side of the corner portion 91, is 60° in the view from the first end face 100 side in the center axis C direction. An angle $\alpha 3$, formed by the upper edges (corner crossing ridge lines) of the two corner faces 140 on each side of the corner portion 91, is 35°. An angle $\alpha 4$, formed by the upper edges (connecting crossing ridge lines) of the two connecting faces 142 on each side of the corner portion 91, is 80°. The upper edge of the center face 141 becomes a contact portion that contacts with the side wall face 41 of the tool main unit 20. A portion of the fourth cutting insert 390, not mentioned here, has the same configuration as the third cutting insert 290, therefore this portion is denoted with the same reference sign as the third cutting inserts 290, and description thereof is omitted.

The above mentioned cutting tool 1 can selectively fix the cutting inserts 90, 190, 290 and 390, to the tool main unit 20.

Figure 18:
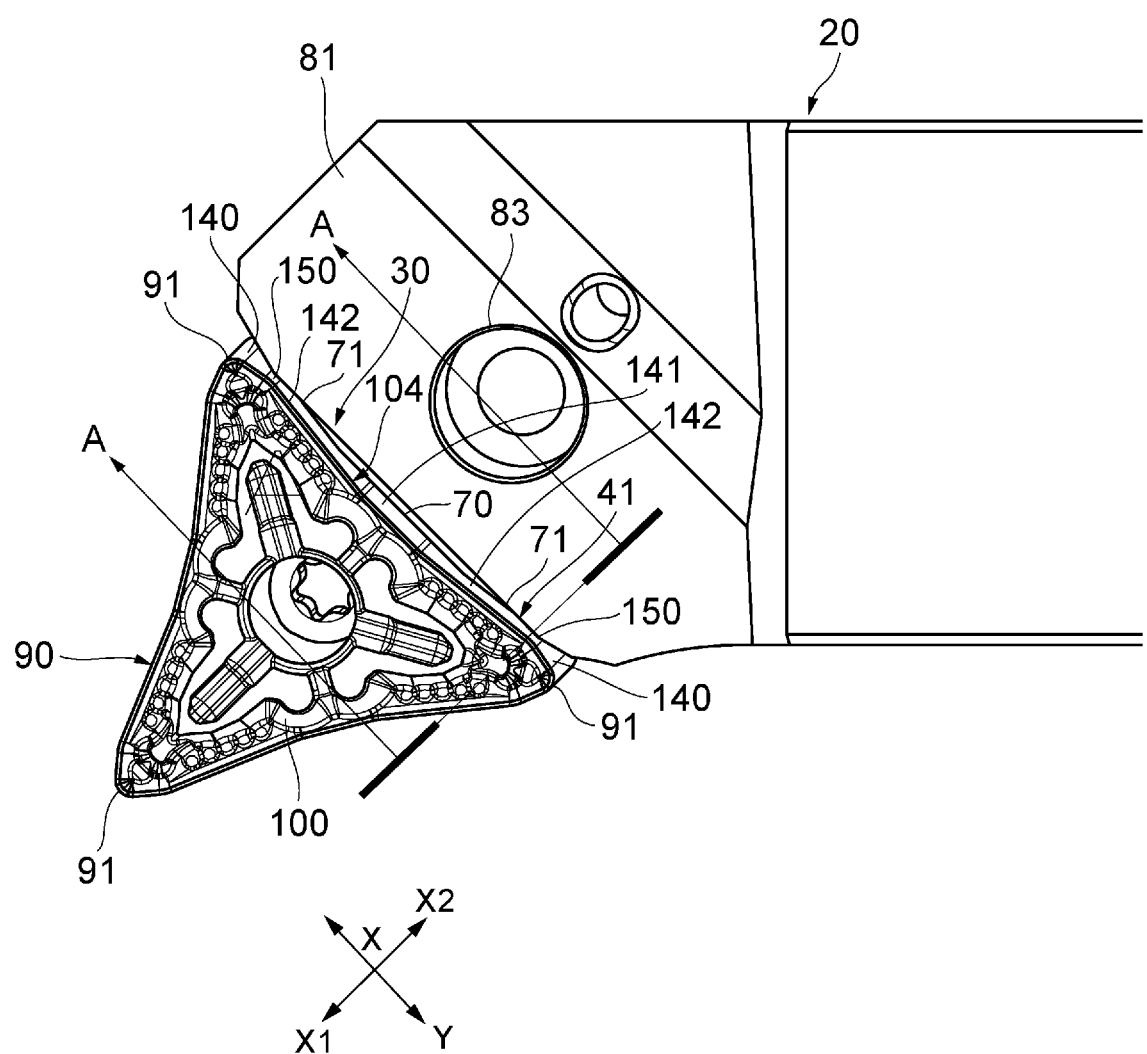
FIG. 18 is an enlarged plan view of the fixing portion of the tool main unit on which the first cutting insert is installed.
Figure 19:
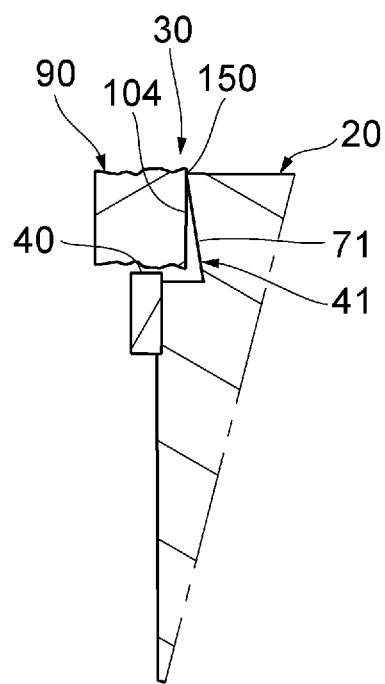
FIG. 19 is a cross-sectional view at A-A in FIG. 18.
Figure 20:
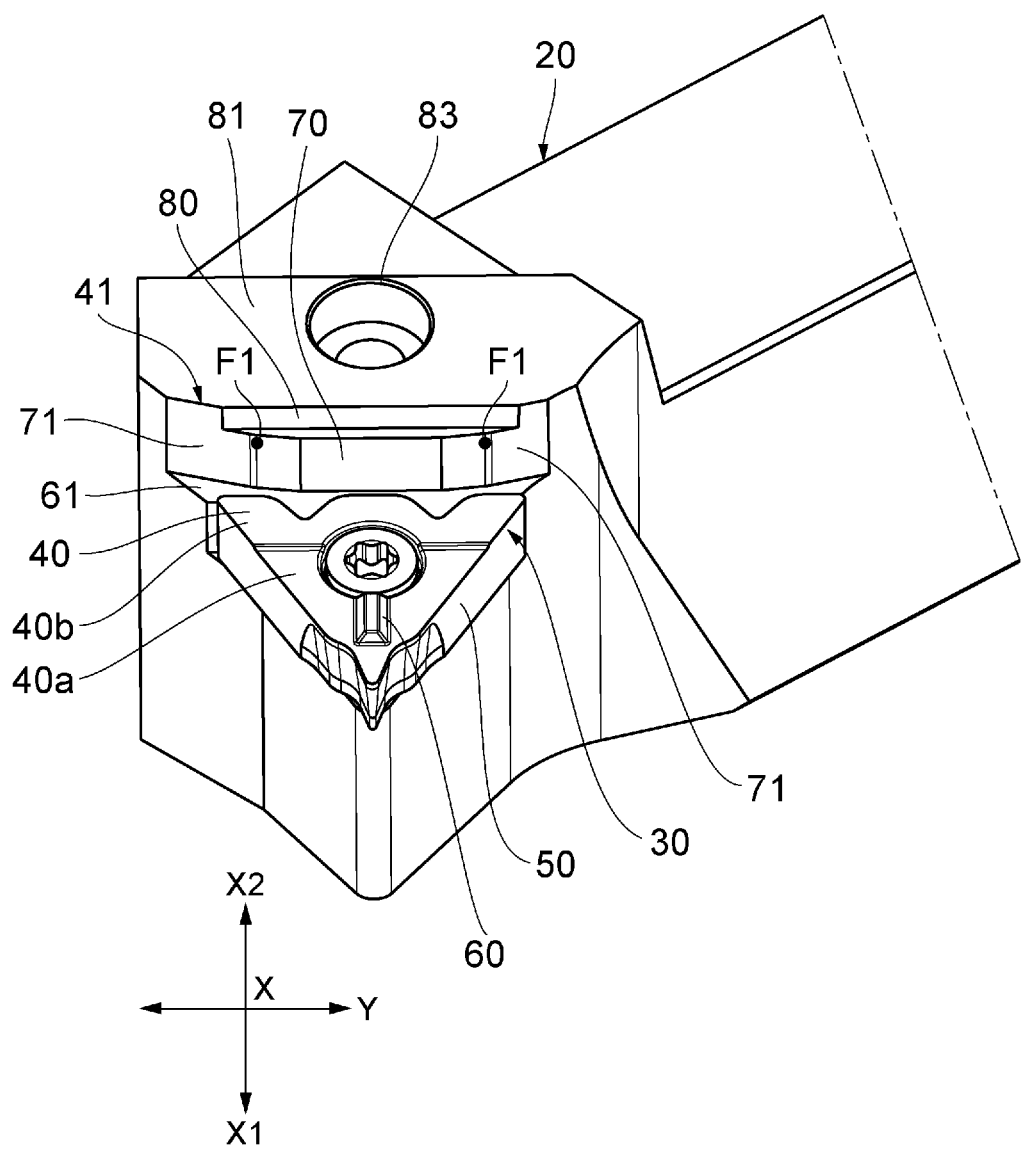
FIG. 20 is a diagram depicting a contact portion between the cutting insert and the tool main unit.

As illustrated in FIG. 18, the first cutting insert 90 is placed in the fixing portion 30 of the tool main unit 20 in a state where one corner portion 91 is pointed toward the front end direction X1, the screw is inserted into the fixing hole 105, and the first cutting insert 90 is fixed to the fixing portion 30 by this screw. Further, the first cutting insert 90 is pressed from above by the clamp 82, as illustrated in FIG. 1. The second end face 101 of the first cutting insert 90 contacts with the bottom face 40 of the fixing portion 30, and the groove 130 of second end face 101 engages with the protruded portion 60. One peripheral side face 104 of the first cutting insert 90 contacts with the tool main unit 20 at two locations of the receded wall faces 71 on both sides of the side wall face 41 of the fixing portion 30. For example, as illustrated in FIG. 19, the convex portion 150 (second portion), which is a connecting portion between the connecting face 142 on the peripheral side face 104 and the corner face 140, contacts with the receded wall faces 71 of the fixing portion 30. At this time, (only) the upper parts of the convex portion 150 and the receded wall faces 71 contact with each other. As illustrated in FIG. 20, the convex portion 150 and each receded wall face 71 contact with each other at point F1.

Figure 21:
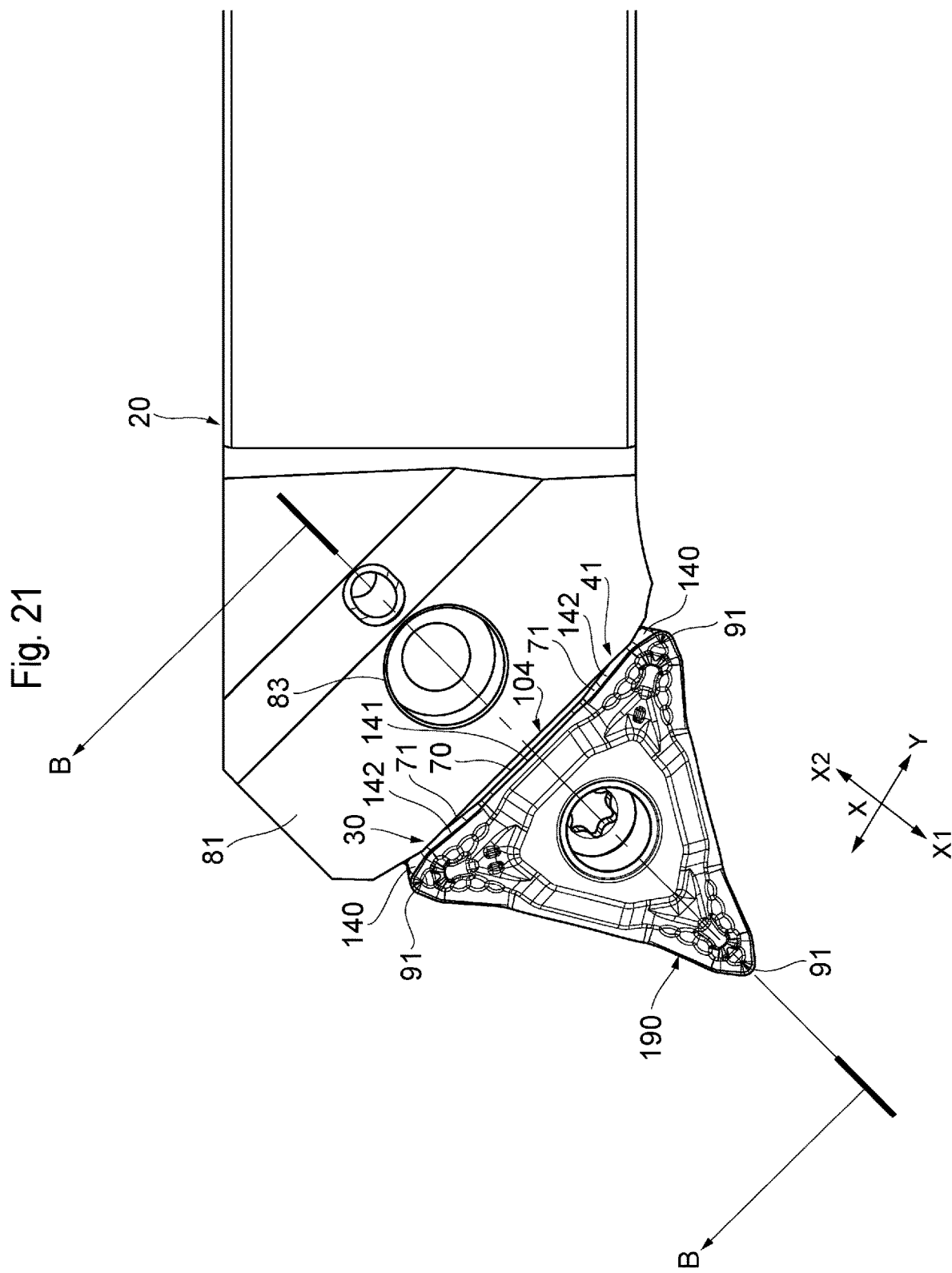
FIG. 21 is an enlarged plan view of the fixing portion of the tool main unit in which the second cutting insert is installed.
Figure 22:
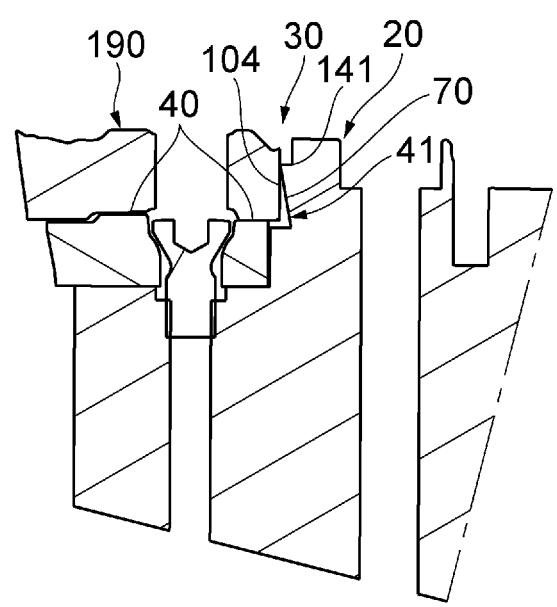
FIG. 22 is a cross-sectional view at B-B in FIG. 21.
Figure 23:
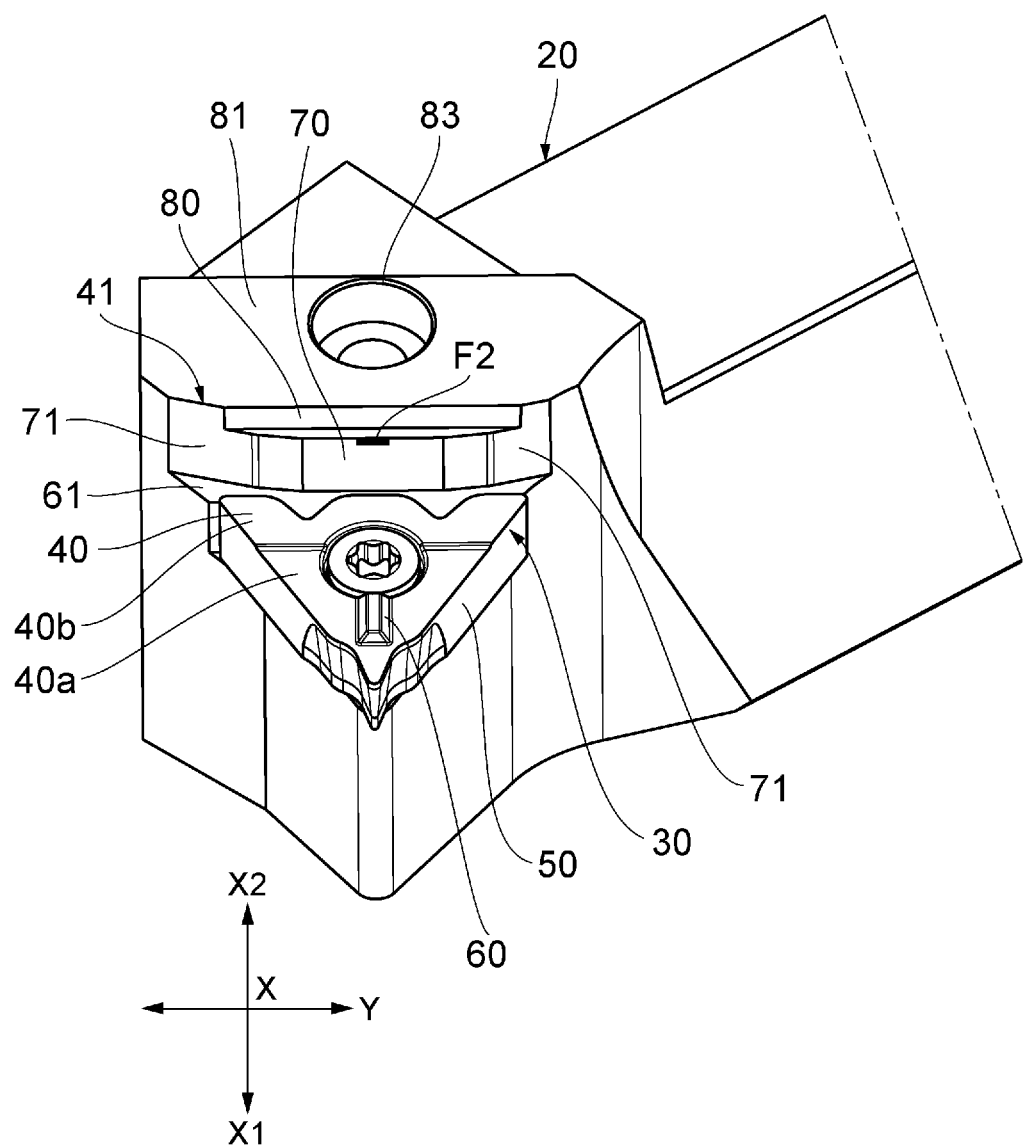
FIG. 23 is a diagram depicting a contact portion between the cutting insert and the tool main unit.

As illustrated in FIG. 21, the second cutting insert 190 is placed in the fixing portion 30 of the tool main unit 20 in a state where one corner portion 91 is pointed toward the front end direction X1, and is fixed to the fixing portion 30 by the screw. The second cutting insert 190 is pressed from above by the clamp 82. The second end face 101 of the second cutting insert 190 contacts with the bottom face 40 of the fixing portion 30, and the groove 130 of the second end face 101 engages with the protruded portion 60. One peripheral side face 104 of the second cutting insert 190 contacts with the tool main unit 20 at one location of the center wall face 70 of the side wall face 41 of the fixing portion 30. For example, as illustrated in FIG. 22, the center face 141 (first portion) of the peripheral side face 104 contacts with the center wall face 70 of the fixing portion 30. At this time, (only) the upper parts of the center face 141 and the center wall face 70 contact with each other. As illustrated in FIG. 23, the contact portion F2 between the center face 141 and the center wall face 70 is a line extending in the left/right direction Y.

Figure 24:
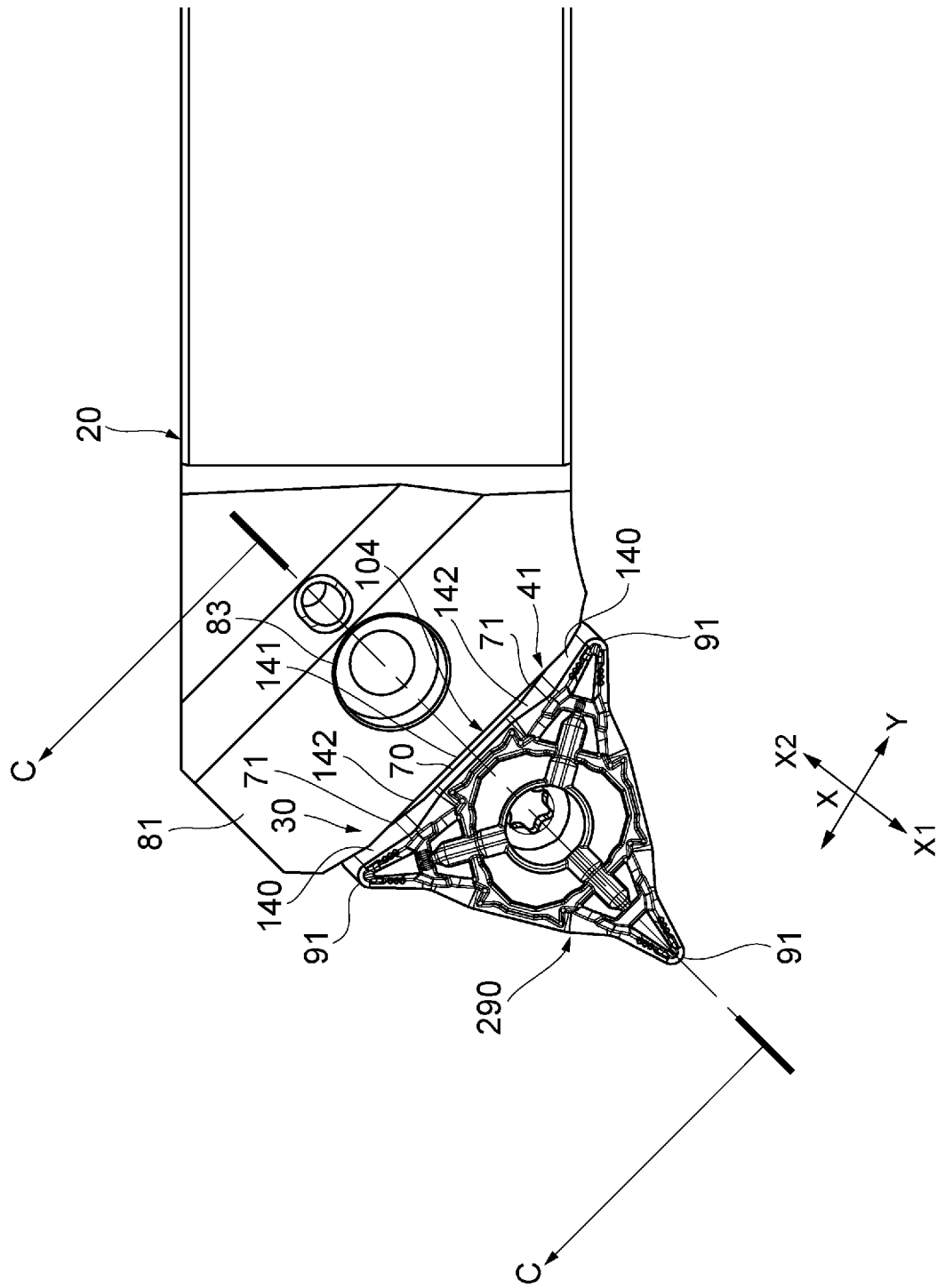
FIG. 24 is an enlarged plan view of the fixing portion of the tool main unit in which the third cutting insert is installed.
Figure 25:
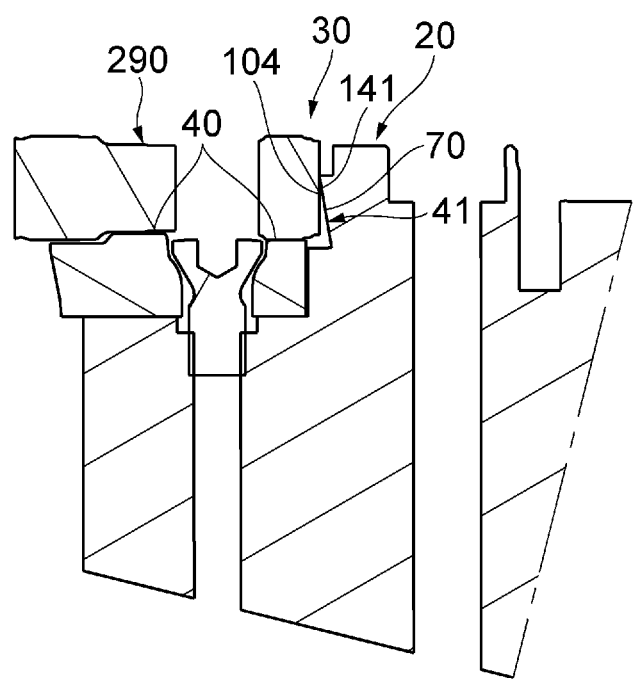
FIG. 25 is a cross-sectional view at C-C in FIG. 24.

As illustrated in FIG. 24, the third cutting insert 290 is placed in the fixing portion 30 of the tool main unit 20 in a state where one corner portion 91 is pointed toward the front end direction X1, and is fixed to the fixing portion 30 by the screw. The third cutting insert 290 is pressed from above by the clamp 82. The second end face 101 of the third cutting insert 290 contacts with the bottom face 40 of the fixing portion 30, and the groove 130 of the second end face 101 engages with the protruded portion 60. One peripheral side face 104 of the third cutting insert 290 contacts with the tool main unit 20 at one location of the center wall face 70 of the side wall face 41 of the fixing portion 30. For example, as illustrated in FIG. 25, the center face 141 (first portion) of the peripheral side face 104 contacts with the center wall face 70 of the fixing portion 30. At this time, (only) the upper parts of the center face 141 and the center wall face 70 contact with each other. As illustrated in FIG. 23, the contact portion F2 between the center face 141 and the center wall face 70 is a line extending in the left/right direction Y.

Figure 26:
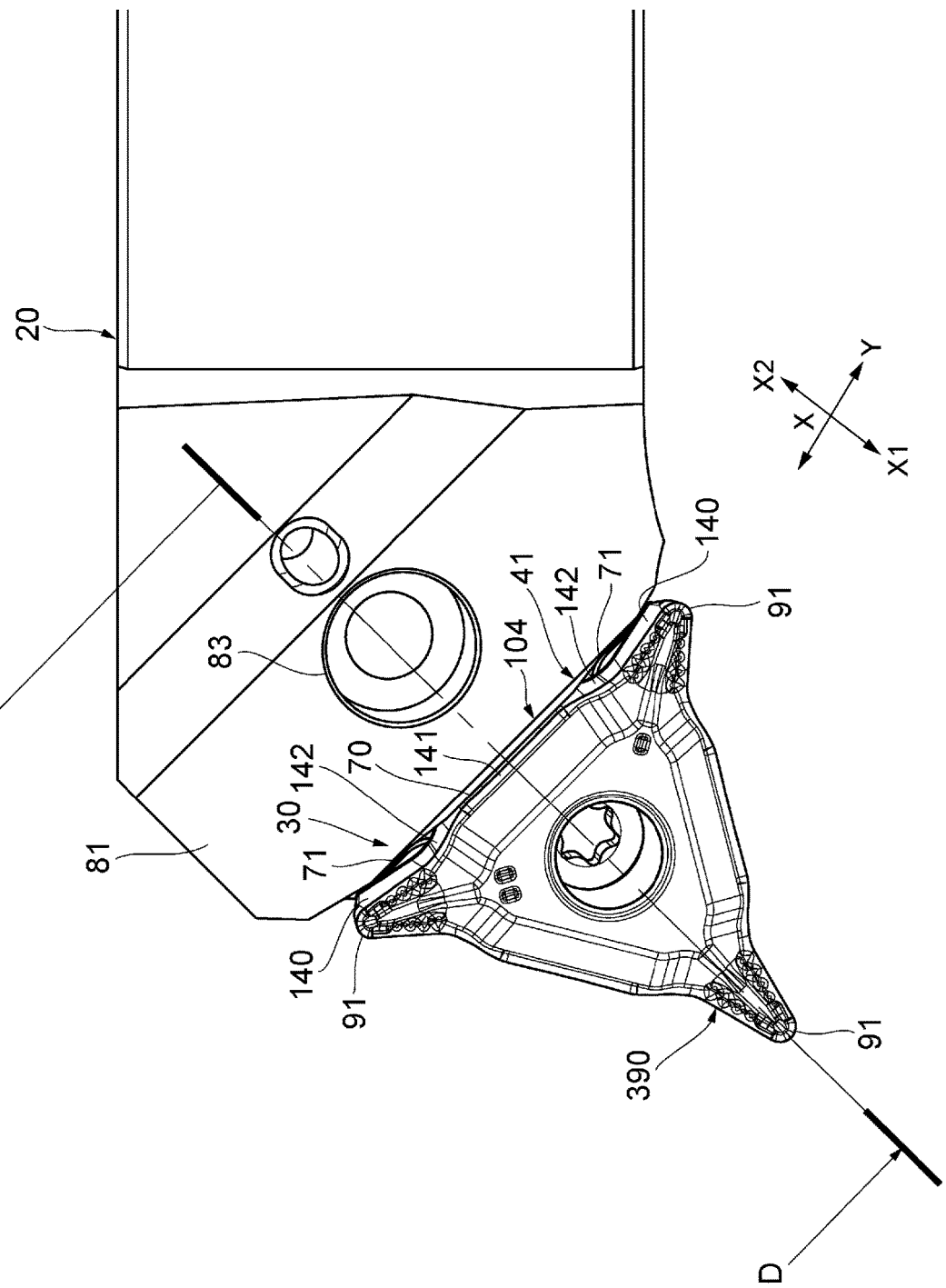
FIG. 26 is an enlarged plan view of the fixing portion of the tool main unit in which the fourth cutting insert is installed.
Figure 27:
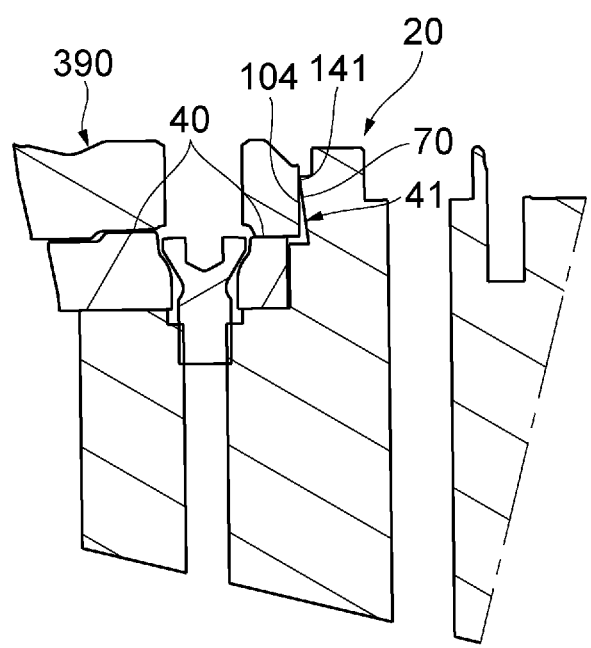
FIG. 27 is a cross-sectional view at D-D in FIG. 26.

As illustrated in FIG. 26, the fourth cutting insert 390 is placed in the fixing portion 30 of the tool main unit 20 in a state where one corner portion 91 is pointed toward the front end direction X1, and is fixed to the fixing portion 30 by the screw. The fourth cutting insert 390 is pressed from above by the clamp 82. The second end face 101 of the fourth cutting insert 390 contacts with the bottom face 40 of the fixing portion 30, and the groove 130 of the second end face 101 engages with the protruded portion 60. One peripheral side face 104 of the fourth cutting insert 390 contacts with the tool main unit 20 at one location of the center wall face 70 of the side wall face 41 of the fixing portion 30. For example, as illustrated in FIG. 27, the center face 141 (first portion) of the peripheral side face 104 contacts with the center wall face 70 of the fixing portion 30. At this time, (only) the upper parts of the center face 141 and the center wall face 70 contact with each other. As illustrated in FIG. 23, the contact portion F2 between the center face 141 and the center wall face 70 is a line extending in the left/right direction Y.

According to this embodiment, the tool main unit 20 has a fixing portion 30 that can selectively fix a plurality of types of cutting inserts 10, including the negative type cutting insert 90 of which angle of the corner portion exceeds 60°, the positive type cutting insert 190 of which angle of the corner portion exceeds 60°, the negative type cutting insert 290 of which angle of the corner portion is less than 60°, and the positive type cutting insert 390 of which angle of the corner portion is less than 60°, and a portion of the side wall face 41 of the fixing portion 30, that contacts with the cutting insert 10, is different depending on the type of the cutting insert 10. Thereby the four types of cutting inserts 10 can be firmly held by one tool main unit 20. As a result, even when the type of the cutting insert 10 is changed, the same tool main unit 20 can be used, and there is no need to replace the tool main unit 20, hence operation efficiency can be improved. Further, there is no need to provide a different tool main unit 20 depending on the type of the cutting insert, and cost can be reduced. Furthermore, one tool main unit 20 can be used for a plurality of types of cutting inserts, even if a number of tool main units 20 that can be installed in a tool rest (e.g. turret) of a machine tool is limited, which is a major advantage of processing a variety of processing shapes for work materials, an ensuring operation efficiency.

The side wall face 41 of the fixing portion 30 has the center wall face 70 at the center, and the receded wall faces 71, which are connected to both ends of the center wall face 70, and are receded from the center wall face 70 in the rear end direction X2, and has the portions that contact with the cutting insert 10 in the center wall face 70 and the receded wall faces 71. Thereby the portion where the cutting insert 10 and the side wall face 41 contact can be selected appropriately depending on the type of the cutting insert 10.

The side wall face 41 of the fixing portion 30 has portions that contact with the cutting insert 10 in the upper part of the center wall face 70 and the upper parts of the receded wall faces 71. Thereby the holding force of the tool main unit 20 on the cutting insert 10 can be increased.

Either the first portion of the center face 141 of the cutting insert 10, or the second portion constituted of the connecting face 142 and the corner face 140, contact with the side wall face 41 of the fixing portion 30, hence the portion where the cutting insert 10 and the side wall face 41 contact can be selected appropriately depending on the type of the cutting insert 10.

Three types of cutting inserts, which are the positive type cutting insert 190 of which angle of the corner portion exceeds 60°, the negative type cutting insert 290 of which angle of the corner portion is less than 60°, and the positive type cutting insert 390 of which angle of the corner portion is less than 60°, contact the common first portion (center face 141) of the side wall face 41 of the fixing portion 30, and the negative type cutting insert 90, of which angle of the corner portion exceeds 60°, contacts a second portion (connecting face 142 and corner face 140), which is different from the common first portion contacted by the three types of cutting inserts 190, 290 and 390, of the side wall face 41 of the fixing portion 30. Thereby the tool main unit 20 can appropriately hold the cutting insert at portions where the holding force increases in accordance with the shape of the outer shell of the cutting insert 10.

The second portion of the side wall face 41 of the fixing portion 30 is located at the outer side of the center of the side wall face 41 more distant from the first portion. Thereby the holding force of the tool main unit 20 in the rotating direction of the cutting insert 90 can be improved.

Although embodiments of the present invention were described with reference to the accompanying drawings, the present invention is not limited to these examples. It is obvious that an expert skilled in the art can arrive at various changes and modifications within the scope of the spirit described in the Claims, and it should be understood that these changes and modifications are included in the technical scope of the present invention.

For example, the configuration of the cutting insert 10 (90, 190, 290, 390) is not limited to those described in the embodiments. For example, the angle α1 of the corner portion of the cutting insert 90 or 190 is not limited to 80°, and the angle α1 of the corner portion of the cutting insert 290 or 390 is not limited to 35°. The negative type cutting insert may be a cutting insert that has no flank in the vicinity of the first end face 100 of the peripheral side face 104, but has a flank in the vicinity of the second end face 101. The tool main unit 20 may be able to hold not only the above mentioned cutting inserts 90, 190, 290 and 390, but also a cutting insert 10 having a different configuration (type).

The present invention is useful to provide a cutting tool that can firmly hold the four types of cutting inserts by one tool main unit.

What is claimed is:

1. A cutting tool comprising a cutting insert and a tool main unit, wherein
    the cutting insert has an approximately triangular prism shape including three corner portions,
    the tool main unit has a fixing portion that can selectively fix a plurality of types of cutting inserts, including a negative type cutting insert wherein each of the three corner portions has an angle exceeding 60°, a positive type cutting insert wherein each of the three corner portions has an angle exceeding 60°, a negative type cutting insert wherein each of the three corner portions has an angle less than 60°, and a positive type cutting insert wherein each of the three corner portions has an angle less than 60°,
    the fixing portion has a bottom face that contacts with a bottom face of the cutting insert, and a side wall face that contacts with a side face of the cutting insert, and
    a portion of the side wall face of the fixing portion, which contacts with the cutting insert, differs depending on the type of the cutting insert.

2. The cutting tool according to claim 1, wherein
    the side wall face of the fixing portion has, at a center, a center wall face, and receded wall faces which are connected to both ends of the center wall face and are receded further backward of the tool main unit than the center wall face, and has portions that contact with the cutting insert in the center wall face and the receded wall faces.

3. The cutting tool according to claim 2, wherein
    the side wall face of the fixing portion has portions that contact with the cutting insert in an upper part of the center wall face and upper parts of the receded wall faces.

4. The cutting tool according to claim 1, wherein
    the cutting insert has three peripheral side faces each of which is located between adjacent corner portions,
    each of the peripheral side faces of the cutting insert includes: a corner face that constitutes a corner portion; a center face that is formed at a center between two adjacent corner portions; and a connecting face that is disposed between the center face and the corner face and connects the center face and the corner face, and
    either a first portion of the center face of the cutting insert or a second portion constituted of a convex portion which is a connection portion between the connecting face and the corner face.

5. The cutting tool according to claim 1, wherein
    three types of the cutting inserts, including the positive type cutting insert with the three corner portions each having the angle exceeding 60°, the negative type cutting insert with the three corner portions each having the angle less than 60°, and the positive type cutting insert with the three corner portions each having the angle less than 60°, when selectively fixed contact a common first portion of the side wall face of the fixing portion, and
    the negative type cutting insert with the three corner portions each having the angle exceeding 60°, contacts a second portion of the side wall face of the fixing portion, which is different from the common first portion contacted by the three types of the cutting inserts.

6. The cutting tool according to claim 5, wherein
    the second portion of the side wall face of the fixing portion is located further outward of the center of the side wall face than the first portion.

7. A cutting insert having an approximately triangular prism shape including three corner portions of which angles exceed 60° or less than 60°, and having three peripheral side faces each of which is located between adjacent corner portions, wherein
    each of the peripheral side faces include: a corner face that constitutes a corner portion; a center face that is formed at a center between adjacent corner portions; and a connecting face that is disposed between the center face and the corner face and connects the center face and the corner face,
    a contact portion that contacts with a tool main unit, when the cutting insert is fixed to the tool main unit of the cutting tool, is formed on a convex portion which is a connection portion between the connecting face and the corner face, and
    the cutting insert is a negative type cutting insert of which angle of the corner portion exceeds 60°.

* * * * *